(12) United States Patent
Liang

(10) Patent No.: US 9,181,455 B2
(45) Date of Patent: Nov. 10, 2015

(54) METHOD OF MAKING HYDROPHOBIC COATED ARTICLE, COATED ARTICLE INCLUDING HYDROPHOBIC COATINGS, AND/OR SOL COMPOSITIONS FOR USE IN THE SAME

(71) Applicant: Guardian Industries Corp., Auburn Hills, MI (US)

(72) Inventor: Liang Liang, Taylor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/692,160

(22) Filed: Dec. 3, 2012

(65) Prior Publication Data

US 2014/0154466 A1 Jun. 5, 2014

(51) Int. Cl.
*B05D 5/06* (2006.01)
*C09D 183/08* (2006.01)
*C03C 17/30* (2006.01)
*C03C 17/36* (2006.01)
*C09D 183/02* (2006.01)
*C09D 183/06* (2006.01)

(52) U.S. Cl.
CPC ............ *C09D 183/08* (2013.01); *C03C 17/30* (2013.01); *C03C 17/3663* (2013.01); *C09D 183/02* (2013.01); *C09D 183/06* (2013.01); *C03C 2217/76* (2013.01); *C03C 2218/113* (2013.01); *Y10T 428/24355* (2015.01)

(58) Field of Classification Search
CPC ............ B05D 5/061; B05D 5/06; B05D 5/08; B32B 17/06; G02B 5/08; C03C 17/30

USPC ........................................................ 427/165
See application file for complete search history.

(56) References Cited

U.S. PATENT DOCUMENTS

| 4,510,344 | A | 4/1985 | Berman |
| 4,806,436 | A | 2/1989 | Tada et al. |
| 5,030,594 | A | 7/1991 | Heithoff |
| 5,977,477 | A | 11/1999 | Shiozaki |

(Continued)

FOREIGN PATENT DOCUMENTS

| EP | 2 355 141 | 8/2011 |
| JP | 1306476 | * 12/1989 |
| JP | 07-122764 | 5/1995 |

OTHER PUBLICATIONS

Att et al., "The effect of UV-photofunctionalization on the time-related bioactivity of titanium and chromium-cobalt alloys". 20 *Biomaterials* 4268-4276 (2009).

(Continued)

*Primary Examiner* — Elizabeth Burkhart
(74) *Attorney, Agent, or Firm* — Nixon & Vanderhye P.C.

(57) ABSTRACT

Certain example embodiments relate to a coated article including a coating formed from a sol that has hydrophobic surface properties. The sol may include a mixture of at least two alkylsiloxane chemicals, with the sol potentially being aged for a certain comparatively short amount of time before being wet-applied to a major substrate surface. The application process may also undergo a certain comparatively short curing process to help provide hydrophobic surface properties. The hydrophobic surface properties help provide anti-soiling functions that are advantageous in a variety of applications including, for example, solar mirror applications.

21 Claims, 10 Drawing Sheets

(56) References Cited

U.S. PATENT DOCUMENTS

| | | | |
|---|---|---|---|
| 6,299,703 | B1 | 10/2001 | Chen et al. |
| 6,410,149 | B1 | 6/2002 | Hendricks et al. |
| 6,506,622 | B1 | 1/2003 | Shiozaki |
| 7,485,343 | B1* | 2/2009 | Branson et al. ............... 427/335 |
| 7,557,053 | B2 | 7/2009 | Thomsen et al. |
| 7,700,870 | B2 | 4/2010 | Thomsen et al. |
| 7,893,350 | B2 | 2/2011 | Thomsen et al. |
| 2006/0169316 | A1 | 8/2006 | Thomsen et al. |
| 2006/0249199 | A1 | 11/2006 | Thomsen et al. |
| 2007/0178316 | A1* | 8/2007 | Mellott ........................ 428/426 |
| 2007/0215205 | A1 | 9/2007 | Thomsen et al. |
| 2009/0011222 | A1 | 1/2009 | Xiu et al. |
| 2009/0223252 | A1 | 9/2009 | Fulton et al. |
| 2009/0304996 | A1* | 12/2009 | Kishikawa et al. ........... 428/141 |
| 2010/0122728 | A1 | 5/2010 | Fulton et al. |
| 2010/0255980 | A1 | 10/2010 | Fulton et al. |
| 2011/0275506 | A1 | 11/2011 | Fulton et al. |
| 2012/0040179 | A1 | 2/2012 | Dave |

OTHER PUBLICATIONS

Barthlott et al., "Purity of the sacred lotus, or escape from contamination in biological surfaces". 202 *Planta* 1-8 (1997).

Bogush et al., "Studies of Silica Sphere Growth". *Proceedings of the 44th Annual Meeting of the Electron Microscopy Society of America* 846-847 (1986).

Brinker et al., *Sol-Gel Science: The Physics and Chemistry of Sol-Gel Processing*. Academic Press, Inc., New York, chapter 3 (pp. 97-233) (1990).

Cassie, A. B. D., "Contact Angles". 3 *Discussions of the Faraday Society* 11-16 (1948).

Crick et al., Preparation and Characterisation of Super-Hydrophobic Surfaces. 16 *Chemistry—A European Journal* 3568-3588 (2010).

Feng et al., "Super-Hydrophobic Surface of Aligned Polyacrylonitrile Nanofibers". 41 *Angewandte Chemie International Edition* 1221-1223 (2002).

Hozumi et al., "Preparation of ultra water-repellent films by microwave plasma-enhanced CVD". 303 *Thin Solid Films* 222-225 (1997).

Iler, R. K., *The Chemistry of Silica*. John Wiley & Sons, Inc., New York (1979).

Khorasani et al., "Wettability of porous polydimethylsiloxane surface: morphology study". 242 *Applied Surface Science* 339-345 (2004).

McHale et al., "Contact-Angle Hysteresis on Super-Hydrophobic Surfaces". 20 *Langmuir* 10146-10149 (2004).

McMurry, J., *Organic Chemistry*, Third Ed. Brooks/Cole Publishing Co., Belmont, CA (1992).

Nakajima et al., "Preparation of Transparent Superhydrophobic Boehmite and Silica Films by Sublimation of Aluminum Acetylacetonate". 11 *Advanced Materials* 1365-1368 (1999).

Nakajima et al., "Preparation of hard super-hydrophobic films with visible light transmission". 376 *Thin Solid Films* 140-143 (2000).

Neinhuis et al., "Characterization and Distribution of Water-repellent, Self-cleaning Plant Surfaces". 79 *Annals of Botany* 667-677 (1997).

Nishino et al., "The Lowest Surface Free Energy Based on—$CF_3$ Alignment". 15 *Langmuir* 4321-4323 (1999).

Pouxviel et al., "NMR Study of the Sol/Gel Polymerization". 89 *Journal of Non-Crystalline Solids* 345-360 (1987).

Riekerink et al., "Selective Etching of Semicrystalline Polymers: $CF_4$ Gas Plasma Treatment of Poly(ethylene)". 15 *Langmuir* 4847-4856 (1999).

Teare et al., "Pulsed Plasma Deposition of Super-Hydrophobic Nanospheres". 14 *Chemistry of Materials* 4566-4571 (2002).

Thieme et al., "Generation of Ultrahydrophobic Properties of Aluminum—A first Step to Self-cleaning Transparently Coated Metal Surfaces". 3 *Advanced Engineering Materials* 691-695 (2001).

Thomas, I. *Sol-Gel Technology for Thin Films, Fibers, Performs, Electronics, and Specialty Shapes*, edited by Klein, L. C. Noyes Publication, Park Ridge, NJ, chapter 1 (pp. 2-15) (1988).

Wenzel, R. N., "Surface Roughness and Contact Angle". 53 *Journal of Physical and Colloid Chemistry* 1466-1467 (1949).

Woodward et al., "Super-hydrophobic Surfaces Produced by Plasma Fluorination of Polybutadiene Films". 19 *Langmuir* 3432 (2003).

"Concentrating Solar Power (CSP) Technologies". Solar Energy Development Programmatic EIS Information Center, available at http://slareis.anl.gov/guide/solar/csp/index.cfm, last viewed on Mar. 1, 2013.

* cited by examiner

Hydrolyzed TEOS or OTMOS

TEOS: $R_1 = R_2 = R_3 = R_4 = CH_3CH_2$

OTMOS: $R_1 = R_2 = R_3 = CH_3$; $R_4 = (CH_2)_7CH_3$ alcohol condensation water condnesation TEOS: $R_1 = R_2 = R_3 = CH_3CH_2$
OTMOS: $R_1 = R_2$ $CH_3$; $R_3 = (CH_2)_7CH_3$ initial particle as nuclei final particle (2-4 nm)

○ $CH_3$
● $CH_2CH_3$
◐ $(CH_2)_7CH_3$

METHOD OF MAKING HYDROPHOBIC COATED ARTICLE, COATED ARTICLE INCLUDING HYDROPHOBIC COATINGS, AND/OR SOL COMPOSITIONS FOR USE IN THE SAME

FIELD OF THE INVENTION

Certain example embodiments of this invention relate to methods of providing hydrophobic surface layers on substrate (e.g., glass substrates), coated articles including such hydrophobic surface layers, and sol compositions for use in the same. More particularly, certain example embodiments of this invention relate to a method of providing hydrophobic surface coatings that provide anti-soiling, self-cleaning, and/or anti-reflection functions, coated articles including such hydrophobic surface layers, and sol compositions for use in the same. In certain example embodiments, a high water contact angle may be achieved using a mixture of at least two alkylsiloxane chemicals that is aged for a short period of time, applied to a major substrate surface through a sol-gel coating process, and cured for a short period of time. When such coatings are used in mirrors for solar applications, for example, such high water contact angle coatings in certain example embodiments have indexes of refraction compatible with the mirrors and help maintain high reflectivity by keeping the mirrors cleaner than they otherwise would be without such coatings.

BACKGROUND AND SUMMARY OF EXAMPLE EMBODIMENTS

Photovoltaic devices such as solar cells (and modules thereof) are known in the art. Example solar cells are disclosed in U.S. Pat. Nos. 4,510,344, 4,806,436, 6,506,622, 5,977,477, and JP 07-122764, the disclosures of which are all hereby incorporated herein by reference in their entireties.

Substrate(s) in a solar cell/module are often made of glass. Incoming radiation passes through the incident glass substrate of the solar cell before reaching the active layer(s) (i.e., photoelectric transfer film such as a semiconductor) of the solar cell. In particular, the power output of a solar cell or photovoltaic (PV) module may be dependant upon the amount of light, or number of photons, within a specific range of the solar spectrum that pass through the incident glass substrate and reach the photovoltaic semiconductor.

In order to enhance solar cell or PV absorption of light, mirrors or lenses may be applied in a solar cell system, e.g., in connection with a concentrated solar power (CSP) system that helps to concentrate a large area of sunlight onto a small area. Concentrated light may be converted to heat, which may drive a heat engine (such as, for example, a steam turbine) that may be operatively connected to an electrical power generator to produce electrical power.

High quality mirrors are highly desirable in order to achieve more efficiency in energy conversion. However, mirror reflections and energy conversion efficiencies are often reduced by dust and other alien particles that adhere to the mirror surface. The particles stack on the surface over time, and create a barrier between light and the active layers under the surface.

It is known to address the contamination issue by using mirrors that may exhibit hydrophobic properties. A hydrophobic mirror surface may exhibit a higher resistance to the attack from dust particles by having a repelling force between mirror surface and dust particles. Hydrophobic properties may also allow less condensation of water and fog, and reduce the likelihood of snow or other frozen material collecting on the mirror surface. Both functions may improve mirror reflection capabilities, and improve power generation efficiencies.

Furthermore, hydrophobic properties of the surface may create a self-cleaning capability. The hydrophobic property may facilitate a rolling action of water droplets on the surface, instead of a sliding action. The rolling of water droplets may effectively remove the dust and unwanted particles on the surface.

Surface energy, surface roughness, and homogeneity are surface properties that can be adjusted and have an impact on hydrophobicity. For example, a surface with a high degree of roughness and low surface energy may show super-hydrophobicity. The highest reported contact angle for a sessile drop of water on a smooth surface is about 120°. However, water contact angles as high as 170° has been achieved with rough and low surface energy materials. Surface roughness produced by a fractal structure may be a factor in the increase of contact angle for a sessile drop of water.

Hydrophobic surfaces have been developed through numerous methods, including plasma etching, plasma deposition, laser treatment, sol-gel processing, anodic oxidation of aluminum, chemical etching and chemical grafting. Among them, the sol-gel approach demonstrates several advantages over other methods, such as, for example, (1) being a simpler process; (2) having a lower cost; (3) being more applicable to implement in a large scale production process; (4) processing at low temperature; and (5) making it easy to combine different materials.

Although hydrophobic coatings are known, further improvements are still desirable. For instance, it would be desirable to provide high water contact angle coatings that have indexes of refraction compatible with the mirrors used in solar applications (including concentrating solar power applications) and that help maintain high reflectivity by keeping the mirrors cleaner than they otherwise would be without such coatings by virtue of the anti-soiling functions. In this regard, in certain example embodiments, a method to enhance the hydrophobic properties of a coated substrate surface is provided. More particularly, the enhancement of anti-soiling and self-cleaning capabilities of surfaces becomes possible through the selection of alkylsiloxane mixtures that are aged and/or cured at different times. In addition to providing anti-soiling capabilities, the coatings of certain example embodiments advantageously achieve good average total reflection and refractive index values. In addition, in certain example embodiments, the water contact angle of sessile drops of water on the coated article surface corresponds to a hydrophobic coating that is in some ways comparable to surface properties of a lotus leaf that allows water droplets (such as, for example, rain drops, etc.) to roll off its surface.

One aspect of certain example embodiments relates to methods of providing an alkylsiloxane sol mixture and/or coating procedures that make a coating that exhibits hydrophobic surface properties on a major surface of a substrate.

Another aspect of certain example embodiments relates to a sol composition that includes a mixture of at least two alkylsiloxane chemicals aged and cured for short periods of time, to obtain a hydrophobic property.

Certain example embodiments of this invention relate to a method of making a coated article comprising a glass substrate supporting a coating. A sol is wet-applied, directly or indirectly, on a major surface of the substrate, the sol comprising at least first and second alkylsiloxane chemicals, with the first and second alkylsiloxane chemicals having tetra-alkoxysiloxane and tri-alkoxysiloxane structures, respectively. The sol is dried and/or cured to form the coating. The sol is aged for no more than five months prior to the wet-applying.

According to certain example embodiments, the alkylsiloxane chemicals are provided at substantially equal weight percentages.

According to certain example embodiments, alkylsiloxane chemicals are selected from the group consisting of octyltrimethoxysiloxane (OTMOS), pentyltriethoxysiloxane (PTEOS), 3,3,3-trifluoropropyl trimethoxysiloxane (TFTMOS), tetraethyl orthosilicate (TEOS), and combinations thereof.

Certain example embodiments of this invention relate to a method of making a coated article comprising a glass substrate supporting a coating. A sol is wet-applied, directly or indirectly, on a major surface of the substrate, with the sol comprising TEOS and OTMOS. The sol is dried and/or cured to form the coating. The coating has an initial contact angle of 100-131 degrees.

Certain example embodiments of this invention relate to a method of making a mirror. A thin film coating is disposed on a first major surface of the substrate, with the thin film coating having a reflectivity of at least about 85%. A sol is wet-applied, directly or indirectly, onto the thin film coating. The sol comprises at least first and second alkylsiloxane chemicals, with the first and second alkylsiloxane chemicals having tetra-alkoxysiloxane and tri-alkoxysiloxane structures, respectively, and with the sol having been aged for no more than three months prior to the wet-applying. The sol is dried and/or cured to form an anti-soiling coating that at least initially has a contact angle of greater than 100 degrees.

According to certain example embodiments, reflection from the mirror is no more than 0.15% lower than the reflection would be if no anti-soiling coating were present.

In certain example embodiments, a sol composition is provided. At least two alkylsiloxane chemicals are provided at substantially the same weight percents. A first alkylsiloxane chemical has a tetra-alkoxysiloxane structure, and a second alkylsiloxane chemical has a tri-alkoxysiloxane structure. The sol composition is aged less than 3 months and has a cure time less than 10 minutes.

In certain example embodiments, a coated article is provided. A multi-layer thin film coating is disposed, directly or indirectly, on a first major surface of a substrate, with the thin film coating having a reflectivity of at least about 85%. A wet-applied anti-soiling coating is formed from a sol aged for no more than about three months prior to the wet application and comprising tetra-alkoxysiloxane and tri-alkoxysiloxane components at least initially provided in substantially equal weight percents. The anti-soiling coating has an initial contact angle theta greater than 100 degrees, a refractive index less than 1.3, a thickness of 60-100 nm, and a root mean square roughness of 3-6.5 nm.

Certain example embodiments may relate to including a substantially similar weight percentage of the alkylsiloxane chemicals in the sol. In addition, or in the alternative, certain example embodiments may have a curing time of preferably less than 25 minutes, more preferably less than 15 minutes, and still more preferably less than 10 minutes. In addition, or in the alternative, certain example embodiments may include an aging time of preferably no more than about five months, more preferably no more than about 3 months, still more preferably no more than or equal to about 1 month, prior to the wet-applying.

It will be appreciated that the example aspects, embodiments, features, etc., may be combined in any suitable combination or sub-combination to provide yet further example embodiments.

BRIEF DESCRIPTION OF THE DRAWINGS

FIGS. 5A-5B are partial perspective views of the top layer at different magnifications, and where FIGS. 5C-5D are cross-sectional views at different magnifications;

DETAILED DESCRIPTION OF CERTAIN EXAMPLE EMBODIMENTS

Figure 1:
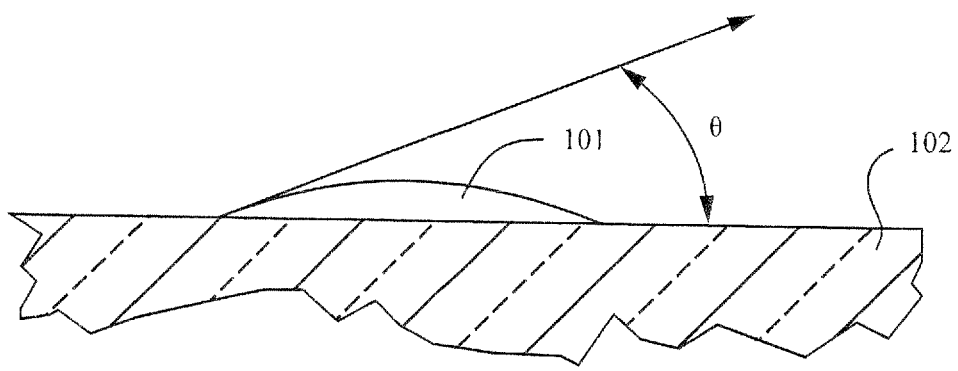
FIG. 1 is a side cross-sectional partially schematic view illustrating a low contact angle theta of a drop on an uncoated glass substrate.

Certain example embodiments relate to a method of making an anti-soiling coated article (such as a mirror or the like) using a sol-gel process, the sols used in such processes, and/or the coated article itself. Such example embodiments may be used in solar cell systems, e.g., in connection with concentrating solar power (CSP) systems and/or the like. It will be appreciated that the term "sol-gel process" as used herein relates to a process where a wet formulation (referred to generally as a "sol") having both liquid and solid characteristics is applied to the glass substrate in the form of a thin gel coating and then heated to form the final solid coating.

In certain example embodiments, sols comprising different alkylsiloxane and silica nanoparticle inclusive sols are prepared. The sols are then used to coat a substrate (e.g., a glass substrate supporting a Cu-based or other mirror layer stack), e.g., to provide an enhanced anti-soiling performance. The sols may be coated onto the substrates using any suitable wet coating technique such as, for example, spin coating, dip coating, roll coating, slot-die coating, meniscus coating, spraying, and/or the like.

In an exemplary embodiment, the substrate is cured in a box furnace at about 50-400° C., more preferably 100-300° C., and sometimes about 200° C. for about 1-30 min., more preferably 3-15 minutes, and sometimes about 5 min., to bind the alkylsiloxane and silica nanoparticles onto the substrate surface. Without wishing to be bound by theory, it is believed that the covalent bond between the hydrolyzed alkylsiloxane and the silica nanoparticles enhances the hydrophobicity of surface. That is, a rough surface is sought and may be generated on the surface by the silica nanoparticles, which may improve the hydrophobicity of the surface.

In another exemplary embodiment, the thin film coated on the surface is in the range of between about 60 nm to about 100 nm, preferably between about 70 nm to about 90 nm, and most preferably between about 75 nm to about 85 nm. The refractive index may be less than 1.5, more preferably below 1.3, and still more preferably below or equal to 1.23. The water contact angle preferably is greater than 80°, more preferably greater than 90°, and sometimes even as high as about 130°, while average total reflection preferably is greater than 85%, more preferably greater than 90%, and sometimes about 94.20%. A durability test that involved thermal cycling and condensing humidity over 5 days showed stable optical and surface performances. Atomic Force Microscope (AFM) images confirm the theorized rough surfaces of the coated substrate surface. In addition, it was found that in some cases an enhanced hydrophobic substrate surface was generated by a sol with a shorter age time. By contrast, a sol with a longer age time may reduce the amount of alkylsiloxane groups on coated surface by hydrolysis and condensation process of siloxane, thereby reducing the hydrophobicity of the substrate's surface.

Example techniques for creating sols in accordance with certain example embodiments, and methods for evaluating coated articles produced using such sols (e.g., in connection with providing an improved hydrophobic surface layer), are discussed below.

Example Sol Compositions

The sol-gel mixtures used in the examples set forth below included octyltrimethoxysiloxane (OTMOS), pentyltriethoxysiloxane (PTEOS), and/or 3,3,3-trifluoropropyl trimethoxysiloxane (TFTMOS). Tetraethyl orthosilicate (TEOS, Aldrich), N-propyl alcohol (NPA, Aldrich), acetic acid (AcOH, Fischer), and nano silica particles (IPA-ST-UP, 15% in IPA, Nissan Chem.) were used in the process without purification. Deionized water with a conductivity of about 18 Ω/cm, and nitrogen gas, also were used in the process. The sols were coated onto substrates supporting Cu-based mirror coatings, and the substrates were 4 mm thick glass substrates. Three paints were provided to the back surface, as manufactured by Guardian. It will be appreciated that other substrates (e.g., different substrate types, different thicknesses, etc.) and/or mirror coatings may be used in connection with different example embodiments.

Sols were prepared with different alkylsiloxane materials in the mixture. In certain example embodiments, the adhesive strength of silica nanoparticles on a substrate surface can be improved when a 50 wt. % TEOS material is used with a tetra-alkoxysiloxane structure mixed with a tri-alkoxysiloxane structure. Exemplary compositions of sols, with TEOS as a basic binder, are compared in Tables 1 to 4.

TABLE 1

Formulation of sol with octyltrimethoxysiloxane (OTMOS) and tetraethyl orthosilicate (TEOS) as binders

| Chem. | M.W. (g/mol) | Wt, g | Wt. % |
|---|---|---|---|
| NPA | 60.1 | 34.852 | 69.809 |
| Deionized water | 18 | 0.904 | 1.811 |
| Acetic acid (AcOH) | 60.05 | 2.444 | 4.896 |
| Octyltrimethoxysiloxane (OTMOS), 50 wt. % | 234.41 | 0.909 | 1.821 |
| Tetraethyl orthosilicate (TEOS), 50 wt. % | 208.33 | 0.909 | 1.821 |
| Nano silica particle (IPA-ST-UP) | — | 9.974 | 19.978 |
| Total | — | 50 | 100 |

TABLE 2

Formulation of sol with pentyltriethoxysiloxane (PTEOS) and tetraethyl orthosilicate (TEOS) as binders

| Chem. | M.W. (g/mol) | Wt, g | Wt. % |
|---|---|---|---|
| NPA | 60.1 | 34.852 | 69.809 |
| Deionized water | 18 | 0.904 | 1.811 |
| Acetic acid (AcOH) | 60.05 | 2.444 | 4.896 |
| Pentyltriethoxysiloxane (PTEOS), 50 wt. % | 234.41 | 0.909 | 1.821 |
| Tetraethyl orthosilicate (TEOS), 50 wt. % | 208.33 | 0.909 | 1.821 |
| Nano silica particle (IPA-ST-UP) | — | 9.974 | 19.978 |
| Total | — | 50 | 100 |

TABLE 3

Formulation of sol with 3,3,3-trifluoropropyl trimethoxysiloxane (TFTMOS) and tetraethyl orthosilicate (TEOS) as binders

| Chem. | M.W. (g/mol) | Wt, g | Wt. % |
|---|---|---|---|
| NPA | 60.1 | 34.852 | 69.809 |
| Deionized water | 18 | 0.904 | 1.811 |
| Acetic acid (AcOH) | 60.05 | 2.444 | 4.896 |
| 3,3,3-Trifluoropropyl trimethoxysiloxane (TFTMOS), 50 wt. % | 234.41 | 0.909 | 1.821 |
| Tetraethyl orthosilicate (TEOS), 50 wt. % | 208.33 | 0.909 | 1.821 |
| Nano silica particle (IPA-ST-UP) | — | 9.974 | 19.978 |
| Total | — | 50 | 100 |

TABLE 4

Formulation of sol with tetraethyl orthosilicate (TEOS) as binders

| Chem. | M.W. (g/mol) | Wt, g | Wt. % |
|---|---|---|---|
| NPA | 60.1 | 34.852 | 69.809 |
| Deionized water | 18 | 0.904 | 1.811 |
| Acetic acid (AcOH) | 60.05 | 2.444 | 4.896 |
| Tetraethyl orthosilicate (TEOS) | 208.33 | 0.909 | 3.764 |
| Nano silica particle (IPA-ST-UP) | — | 9.974 | 19.978 |
| Total | — | 50 | 100 |

An exemplary procedure to prepare the sols listed in Tables 1 and 4 is as follows: 1) 34.852 g of NPA is added into a 200 ml glass bottle with a magnetic bar; 2) 0.904 g of deionized water, 0.909 g of OTMOS, 0.909 g of TEOS and 9.974 g of IPA-ST-UP is added to the NPA to form a mixture; 3) 2.444 g of acetic acid is added to the mixture to create a solution; and 4) the solution is stirred immediately at room temperature for about 24 hours before using. The example sols listed in Tables 1, 2 and 3 were aged 24 hours before usage. The example sol composition listed in Table 4 was aged at room temperature for two separate aging times: one month and eight months. There was no precipitation in any of the example sols during the preparation and storage periods.

The sols used to coat the substrates were colloidal solutions that included elongated $SiO_2$ nanoparticles and tetraethyl orthosilicate (TEOS) as a binder. One specific type of sol used in this disclosure as the comparable baseline is the TEOS-only sol composition listed in Table 4. The solid weight percent of sol are noted herein. However, the percentages may vary under desired conditions and parameters, and are not limited to the values presented in this disclosure.

Example Substrate Preparation and Coating Procedures

Conventional pre-cleaning and/or washing steps may be used to prepare a substrate for coating using relatively weak acid and base solutions. An example procedure may include the following steps: 1) dipping a substrate into a mixture of an HCl solution of about 2% concentration and an $HNO_3$ solution of about 2% concentration for about 10 minutes; and 2) washing the dipped substrate with a soap solution and deionized water; and 3) drying the washed substrate using $N_2$ gas. The cleaning process could be also implemented by plasmas, electron beam, ultrasonic, and/or glow discharge related techniques. However, it will be appreciated that other pre-cleaning and/or washing procedures including the use of other concentrations and/or types of cleaning solutions may be possible in different implementations.

An exemplary procedure to coat a substrate using the siloxane-inclusive sol mixtures disclosed herein, including the example sol mixtures disclosed in Tables 1 to 4 above, for example, may include spin coating, dip coating, roll coating, slot-die coating, meniscus coating, and/or the like. When a spin-coater is used, the following conditions may be implemented to create a suitable coating: 1) mounting a substrate on a sample stage of a spin coater; 2) placing a specific amount of sol (e.g., about 0.5 mL) onto a top surface of the substrate; 3) spinning the substrate at a suitable speed with an optional suitable ramp and suitable spin time (e.g., about 3000 rpm with a ramp speed of about 255 rpm, and a spin time of about 30 sec); and 4) setting the coated substrate in a furnace (e.g., at about 200° C. for about 5 min.) in order to cure the sol on the substrate surface. The curing of thin film could be also processed by IR, UV, and/or microwave related techniques, which may in some instances provide more controllable features. It will be appreciated that other suitable procedures and/or process conditions may be used to create a similar thin-film coating. For instance, the example cure temperatures and/or times identified above may be used in certain example embodiments.

Example Evaluation Procedures

Samples generally may be evaluated using conventional methods applicable to the particular sample produced and other conditions and limitations to be imposed onto the sample. Example measurement techniques and devices including those used herein are set forth below. However, it will be appreciated that other evaluation procedures, equipment, etc., may be used in different cases.

Broadband reflection of coated substrates may be measured using a UV-Vis spectrophotometer such as, for example, the PerkinElmer LAMBDA 1050 UV/Vis/NIR Spectrophotometer. The broadband spectrum of between 300 nm and 2500 nm is used herein, although other spectra may be used in different cases. The average total reflection, R %, may be calculated using Eq. (1):

$$R\% = \frac{\sum_{i=300}^{2500} \rho_h(\lambda_i, \theta, h) E_\lambda(\lambda_i) \Delta\lambda_i}{\sum_{i=300}^{2500} E_\lambda(\lambda_i) \Delta\lambda_i} \quad (1)$$

where $\rho_h(\lambda, \theta, h)$ is hemispherical reflection spectrum; $E_\lambda(\lambda_i)$ is direct solar irradiance spectrum, and $\Delta\lambda$ is wavelength interval. The wavelength interval is 5 nm. It will be appreciated that other formula may be used, e.g., where different spectra are involved.

The reflection gain of the sol coated substrates, $\Delta R\%$, may be calculated by: 1) subtracting R % of raw mirror glass from R % of coated mirror glass in the case of developed mirror glass as shown in Eq. (2); and 2) subtracting from pre R % of coated mirror glass from post R % of coated mirror glass in the case of durability test as shown in Eq. (3).

$$\Delta R\%_{Optical} = (R\%)_{coated} - (R\%)_{raw} \quad (2)$$

$$\Delta R\%_{Durability} = (R\%)_{postcoated} - (R\%)_{precoated} \quad (3)$$

Measurement of water contact angle of a drop (e.g., a sessile drop) on the substrate may be conducted using a contact angle instrument such as, for example, a First Ten Angstroms device 136 for the measurement of contact angles of a sessile drop (FTA 136). A sessile drop of de-ionized water, e.g., about 6 μl, may be wetted on the substrate surface, and the contact angle of the drop may be measured immediately thereafter. The data reported below corresponds to the average values measured from three points on a substrate surface. Calculations of the contact angles were performed using the First Ten Angstroms measurement software, version 1.966.

Optical thickness and refractive index of the coated substrate may be measured using an Ellipsometer (such as the J. A. Woollam Co., HS-190 device). The mirror sample may be scanned with multiple angles in order to measure the complex reflectance ratio, ρ which is parameterized by Ψ and Δ. The refractive index of coated substrate may be reported at the wavelength of 550 nm, although different wavelengths are of course possible.

The topography of the surface of the coated substrates may be investigated qualitatively using an atomic force microscope (AFM, e.g., the AP-0100, Parker Sci. Instrument). The non-contact method, preferred for soft surfaces in general, may be used in some cases. The size of mirror sample may be about 1 cm×1 cm and the scanning area may be about 5 μm×5 μm. The scanning rate used herein is 0.5. The sample roughness may be characterized quantitatively by measuring the arithmetic average roughness, $R_a$, and root mean square roughness, $R_m$. $R_a$ and $R_m$ are described in Equations (4) and (5), below.

$$R_a = \frac{1}{n}\sum_{i=1}^{n} |y_i| \quad (4)$$

$$R_m = \sqrt{\frac{1}{n}\sum_{i=1}^{n} y_i^2} \quad (5)$$

where $y_i$ is the height of peak in AFM image.

The morphologies of the anti-soiling glass may be observed by using a scanning electronic microscope such as, for example, a Hitachi S4800 field emission SEM. The working distance used was 4.0 mm and 6.7 mm for images with top surface, with a rotated position of 45 degrees. The measurements were taken using a tungsten coated layer with a thickness of between 5 nm and 10 nm on the surface of the present samples. The accelerating voltage for the measurements was 30 kV.

An x-ray photoelectron spectroscopy (XPS) spectrum of anti-soiling mirror may be analyzed using an X-ray photoelectron spectroscope such as the PHI Quantera XPS, with a monochromated Alk$_\alpha$ as x-ray source, and a voltage of 1486.6 eV. An analyzed area of each of the example substrates was about 1.5 mm×1.5 mm, using a charge correction in C1s (C—C/C—H) of 284.8 eV.

A variety of durability tests also may be performed. For instance, durability may be measured using a high-temperature/high-humidity (HT-HH) or condensing humidity test, a thermal cycling test, and/or the like. During the condensing humidity test, coated substrates having a size of 2"×2" are placed vertically onto a plastic sample holder. The sample holder is subjected to 85° C. temperatures at 85% relative humidity (although higher or lower temperatures and/or relative humidity values may be used in different test scenarios). The substrates are then removed from the chamber, washed with deionized water, and tested with an UV-vis spectrophotometer for reflection capabilities. A surface performance test measurement of water contact angles also may be performed (e.g., using the FTA 136 as noted above). In general, a sample may pass the condensing humidity test if the calculated ΔR % is less than or equal to 1%, and has no visual damage in the surface coating.

Thermal cycling tests also may be performed, e.g., in connection with 2"×2" coated substrates that are placed vertically onto a plastic sample holder. The sample holder is subjected to a variation of humidity and temperature ranges. The temperature is first raised from about 25° C. to about 85° C. within about 1 hour, with a humility range of about 50% to about 85%. The temperature is held at about 85° C. for about 20 hours before it is decreased to about −40° C. for about 1 hour. The temperature is then raised from −40° C. to 25° C. within about 0.5 hours, and then raised from 25° C. to 85° C. to complete one thermal cycle. It will be appreciated that other temperature values and/or ramps may be used in different test scenarios. In general, a sample may pass the thermal cycling test if the calculated ΔR % is less than or equal to 1%, and has no visual damage in the surface coating.

As indicated above, the measuring techniques and apparatuses described above are examples that could be used to measure example embodiments. It will be appreciated that other suitable measuring techniques, procedures, and/or apparatuses may be used in connection with other applicable conditions and parameters to assess example embodiments produced in accordance with the techniques disclosed herein. Exemplary results of the disclosed examples using the parameters described above are presented in the following tables and figures.

Example Sample Evaluation Results

I. Water Sessile Drop Contact Angles and Mobility

Figure 2:
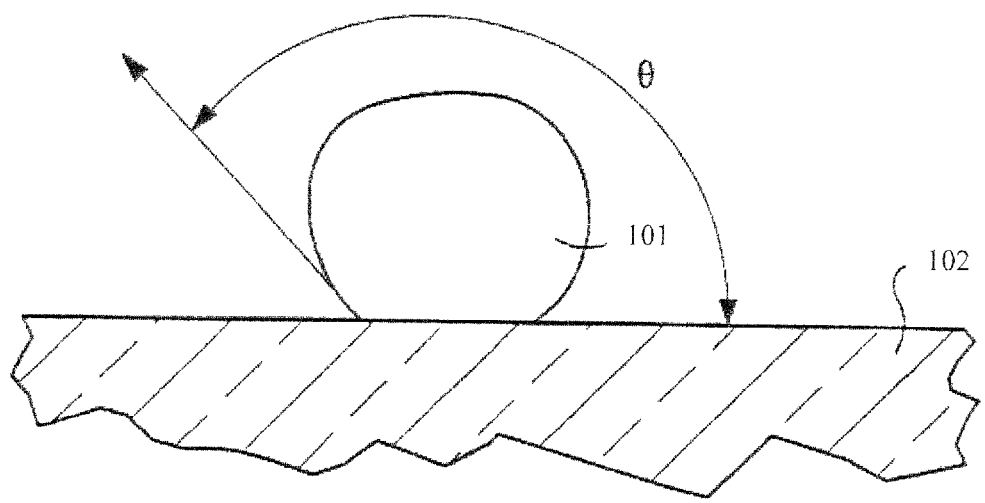
FIG. 2 is a side-cross sectional partially schematic view of the high contact angle theta that is possible when hydrophobic coatings are provided on a substrate.

In FIGS. 1 and 2, water contact angles are depicted for a sessile drop of water 101 on a surface 102. The water contact angle is measured as θ. FIG. 1 is a side cross-sectional partially schematic view illustrating a low contact angle theta of a drop on an uncoated glass substrate, and FIG. 2 is a side-cross sectional partially schematic view of the high contact angle theta that is possible when hydrophobic coatings are provided on a substrate.

Table 5 lists the water contact angle of substrates coated by sols with different siloxane mixtures in the present example, the composition of which is shown above in Tables 1 to 4. Measured water contact angles of the coated substrates are in the range of about 108° to about 131°, depending on the sol composition. Water contact angles are measured using a sessile drop of water and equipment such as the FTA 136. Compared to the water contact angle of an uncoated substrate, which typically is about 20°, the increase in the water contact angle of coated substrates may be attributed to the alkylsiloxane group covalently attached onto the substrate surface. The order of the water contact angles in the present example is: OTMOS (131°)>PTEOS (120°)>TFTMOS (113°)~TEOS (108°). This shows that an increase on the carbon number of alkylsiloxane compound, which corresponds to an increase of hydrophobicity of the siloxane mixture, enhances the hydrophobicity of the substrate surface.

TABLE 5

Water contact angle of substrates coated using sols with different alkylsiloxanes

| ID | Siloxane in sol | wt. % of sol | Contact angle | | | R % avg. | R % STD |
|---|---|---|---|---|---|---|---|
| 368-180-1 | Octyltrimethoxysiloxane (OTMOS)/TEOS (50:50 wt. ratio) | 2 | 117.51 | 146.92 | 128.96 | 131.13 | 14.82 |
| 368-180-2 | Pentyltriethoxysiloxane (PTEOS)/TEOS (50:50 wt. ratio) | 2 | 123.64 | 118.17 | 120.23 | 120.68 | 2.76 |
| 368-180-3 | 3,3,3-Trifluoropropyl trimethoxysiloxane (TFTMOS)/TEOS (50:50 wt. ratio) | 2 | 119.48 | 109.81 | 110.39 | 113.23 | 5.42 |
| 368-180-4 | Tetraethyl orthosilicate (TEOS) | 2 | 103.95 | 119.1 | 103.67 | 108.91 | 8.83 |

Figure 3:
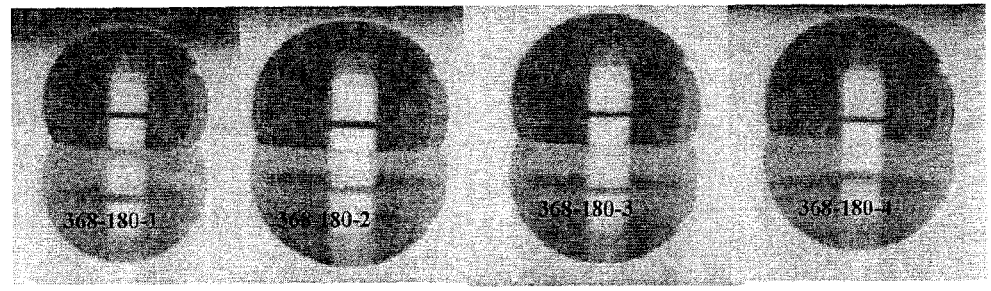
FIG. 3 is a series of images of sessile drops of water on substrates coated with the different alkylsiloxane sols, displaying high water contact angles.

Aged time of sol < 1 month
Spin coating: 3000 rpm; 255 ramp; 30 sec; 0.5 ml of sol
Curing at 200° C. for 5 min FIG. 3 is a series of images of sessile drops of water on substrates coated with the different alkylsiloxane sols, displaying high water contact angles.

Figure 4:
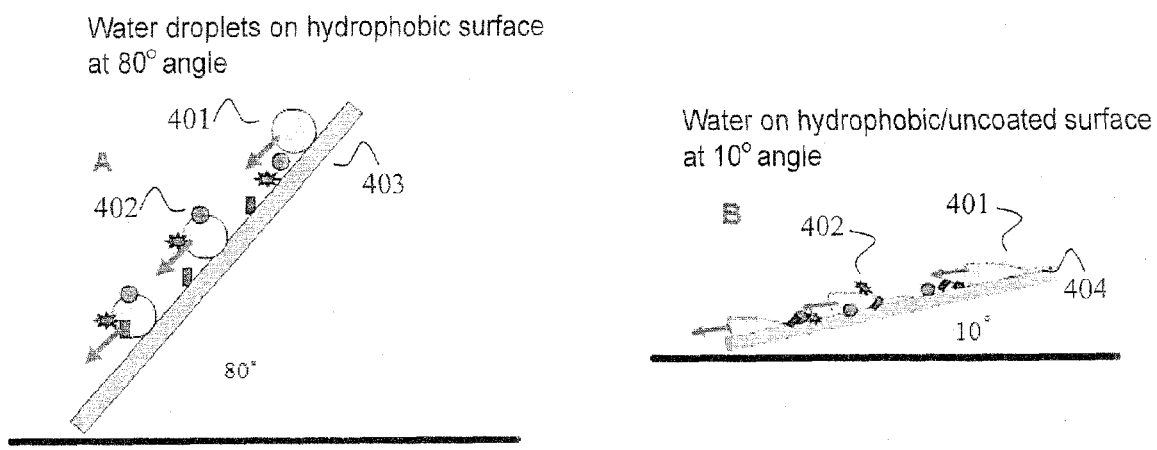
FIG. 4A shows water droplets on a substrate coated by using a sol comprising octyltrimethoxysiloxane (OTMOS) and tetraethyl orthosilicate (TEOS) set at 80° in accordance with certain example embodiments.
FIG. 4B shows water droplets on an uncoated substrate set at 10°.

The hydrophobicity of the substrate surface is further confirmed by the mobility of water droplets compared between a coated substrate surface and an uncoated substrate surface. Mobility tests were conducted where water droplets were placed on a coated substrate surface and an uncoated mirror. Both substrates were set on a table at different level angles. FIGS. 4A and B are schematic drawings of the movement of the water droplets on the two types of surfaces. In FIG. 4A, water droplets 401 are seen to adhere to a coated surface 403 set at an 80° angle with respect to the horizon and stay in a droplet shape. Characteristics of water droplets 401 with a near-spherical form on a hydrophobic surface 403 may allow water droplets 401 to roll across the surface 403, and pick up the alien particles 402.

In comparison, in FIG. 4B, water droplets 401 are not able to adhere to an uncoated surface 404 set at a 10° angle with respect to the horizon. Instead, the water droplets 401 on the uncoated surface 404 slid quickly to the bottom of the surface 404, and then accumulated at the bottom. It is believed that the adherence property is due to the hydrophobicity of a coated surface. It is also believed that the rough and nano-scale "dot structure" on the coated surface may also act to trap air underneath the water droplets, which may enhance the rolling motion.

II. Morphology

Figure 5:
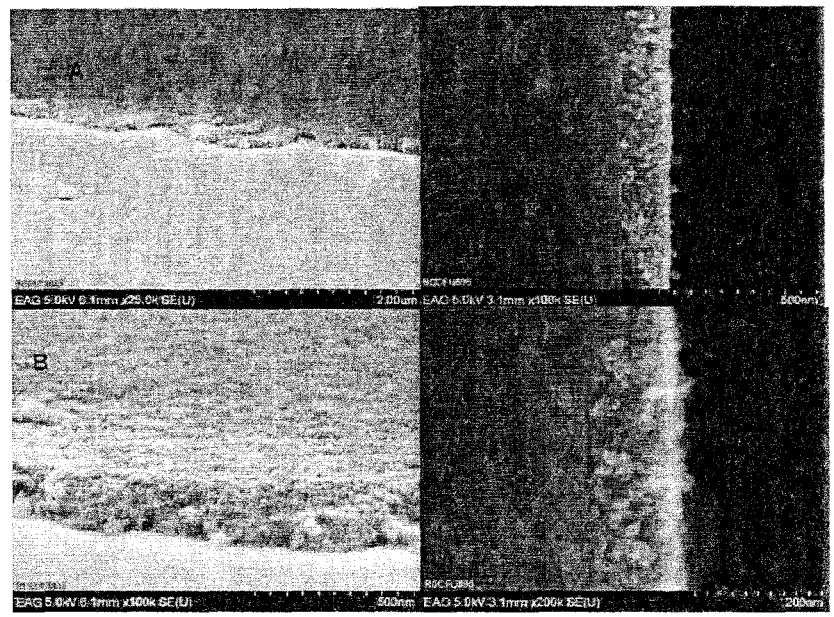
FIGS. 5A, 5B, 5C, and 5D are Scanning Electronic Microscope (SEM) images of an anti-soiling substrate surface in accordance with certain example embodiments, where

Results of an SEM morphology investigation of the coated substrates are shown in FIGS. 5A, 5B, 5C, and 5D. The hydrophobic characteristics displayed by water droplets on a coated surface can be explained using a morphology of the coated surface. FIGS. 5A, 5B, 5C, and 5D are SEM images of a substrate surface coated by the sol mixture listed in Table 4. FIG. 5A shows the morphology of a top layer of the surface in a 25K magnification, and FIG. 5B shows the morphology of the same top layer of the surface in a 100K magnification.

FIG. 5C shows a cross-sectional view of the top layer at a 100K magnification, and FIG. 5D shows a cross-sectional view of the top layer at a 200K magnification. Substantially uniform nano-dots with a diameter of around 20 nm is clearly observable on the substrate surface. Morphology of the nanoparticle coated substrate is found to be similar to a morphology of a lotus leaf. Because of the similarity in morphology observed, it is believed that the nanoparticle coated substrate surfaces may exhibit similar hydrophobicity characteristics as the lotus leaf in allowing water droplets to roll off the contact surface.

Figure 6:
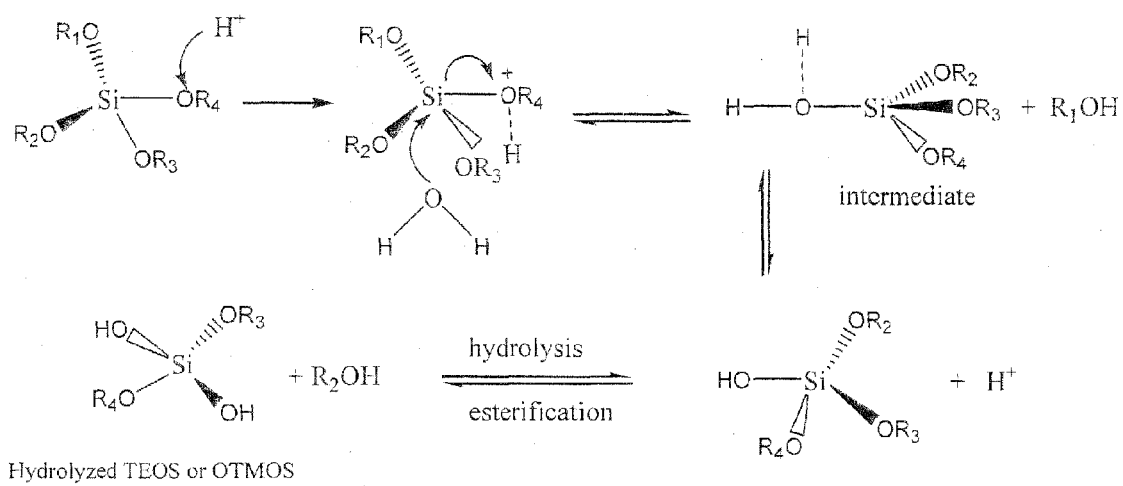
FIG. 6 is a chemical reaction showing the hydrolysis of TEOS or OTMOS using an acid catalyst in accordance with certain example embodiments.

Formation of an anti-soiling coating layer on the surface of a substrate in the present example can be described using chemical reactions that occur during a sol-gel coating process. TEOS and/or other siloxanes (e.g. OTMOS) can be hydrolyzed by $SN_2$ mechanisms in the presence of an acetic acid. FIG. 6 shows the expected hydrolysis process of siloxanes, i.e. TEOS and OTMOS, with acetic acid as a catalyst. First, the electrophilicity of the Si atom is enhanced by the attack of a proton, $H^+$, which is released from the acetic acid to the OR group of the alkylsiloxane. The intermediate as shown in FIG. 6 is generated by the reaction of water with a Si atom. The reaction intermediate produces the hydrolyzed siloxane and releases one alcohol molecule and one proton, $H^+$, which can be recycled as a catalyst again. This process may be repeated to generate various fully hydrolyzed siloxane, i.e. silicic acid $Si(OH)_4$. In addition, the esterification might be one reversible reaction existing in the hydrolysis.

Figure 7:
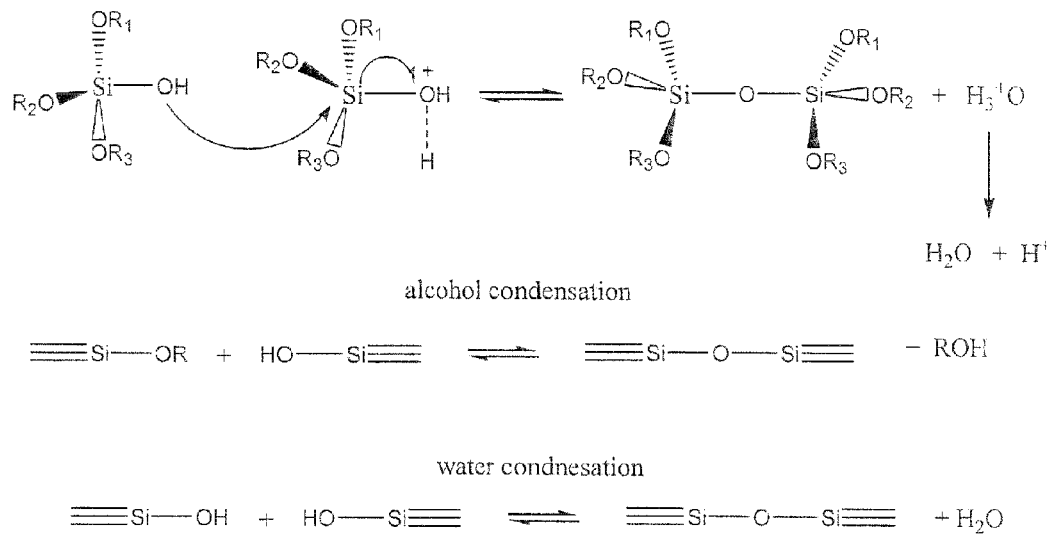
FIG. 7 is a chemical reaction showing the condensation of hydrolyzed TEOS and OTMOS in accordance with certain example embodiments.
Figure 8:
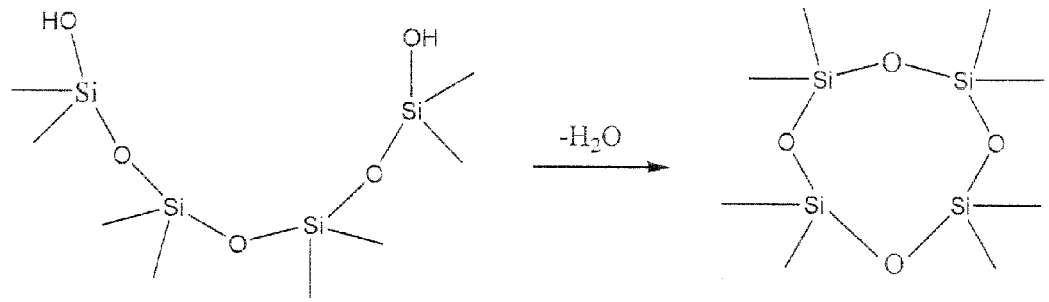
FIG. 8 is a chemical reaction showing the formation of cyclic siloxane through condensation of a tetramer in accordance with certain example embodiments.

It is further believed that the condensation of hydrolyzed TEOS or OTMOS can be condensed by water and alcohol condensation, e.g., as shown in FIG. 7. During the condensation process, cyclic siloxane with different cyclic numbers may be formed by partially condensed TEOS and OTMOS, such as, for example, the tetra-cyclic siloxane shown in FIG. 8. It is believed that a primary cyclic siloxane is generated from the tetramer because of a lesser strain on the cyclic compound.

Figure 9:
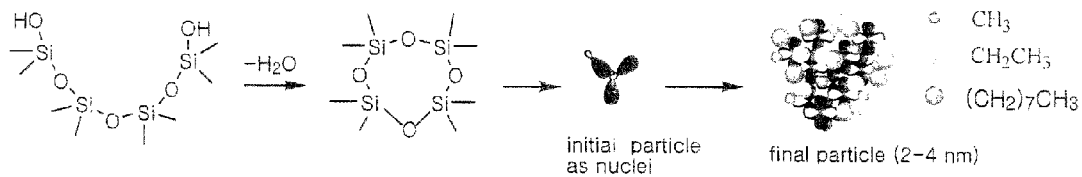
FIG. 9 is a chemical reaction showing the formation of a nanoparticle with different alkylsiloxane groups on the surface of the nanoparticle in accordance with certain example embodiments.
Figure 10:
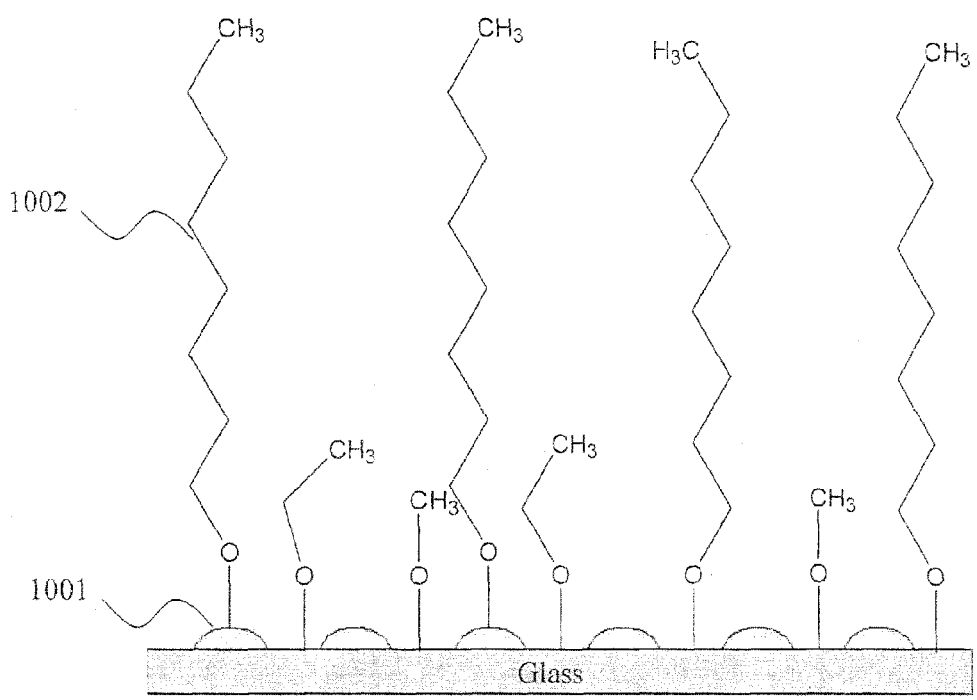
FIG. 10 is a schematic drawing of a hydrophobic surface of a coated substrate created using an alkylsiloxane-inclusive sol.

Then, as shown in FIG. 9, amorphous $SiO_2$ particles with a continuous random network structure and alkylsiloxane groups on the surface of nanoparticles can be generated by a reaction between a cyclic siloxane and a hydrolyzed siloxane. The three-dimensional particles may serve as nucleation sites and further growth may occur by an Ostwald ripening mechanism, whereby the particles grow in size and decrease in number as highly soluble small particles dissolve and reprecipitate on larger and less soluble nuclei. Growth may stop when the difference in solubility between the smallest and largest particle becomes only a few ppm. More generally, the particle may grow to the size of at least about 1 nm, preferably between about 1 nm to about 5 nm, more preferably between about 2 to about 4 nm, and with precursor solution of pH between about 1 to 8, preferably about 2 to about 7, and more preferably about 3 to 5. Specifically, the particle may stop the growth when it reaches the size about 2 to about 4 nm with precursor solution of pH about 2 to about 7. As a result, a substrate surface coated by the sol mixtures, e.g., the sol compositions listed in Table 1 to 4, may exhibit various alkylsiloxane groups and chains attached onto the surface of a substrate as shown in FIG. 10. The nano dots 1001 from the nano-particles in the sol coats the substrate glass, while the alkylsiloxane chain groups 1002 extend from the substrate surface to create a rough surface.

III. Reflection

Figure 11:
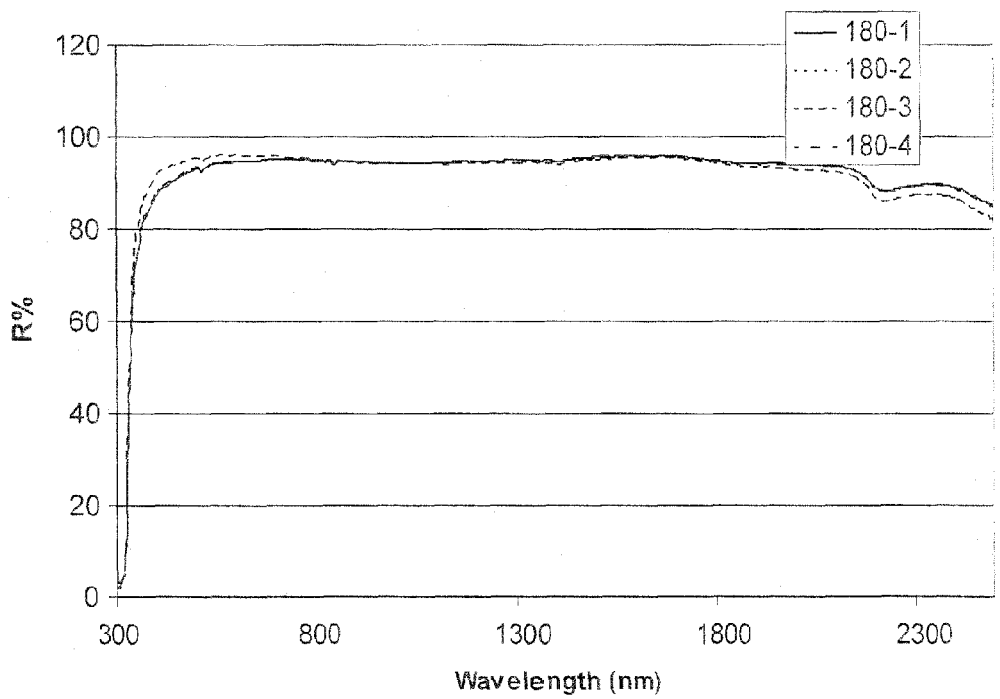
FIG. 11 is a graph that shows the average total reflection of substrates coated with different siloxane-inclusive sol compositions.

FIG. 11 is a graph that shows the average total reflection of substrates coated with the siloxane-inclusive sol compositions of Tables 1 to 4 above. It will be appreciated that the reflection curves display almost the same pattern for each of the alkylsiloxane sols.

IV. X-Ray Photoelectronic Spectrum

Figure 12:
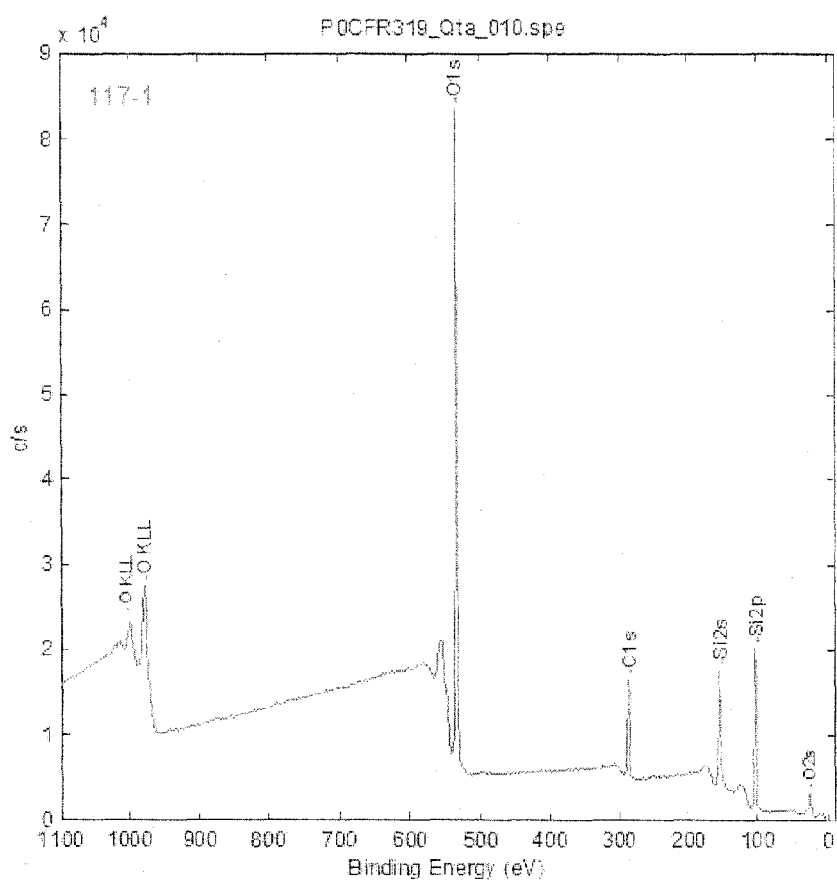
FIG. 12 is an x-ray photoelectron spectroscopy (XPS) survey spectrum of an anti-soiling substrate surface of sample 368-180-1.
Figure 13:
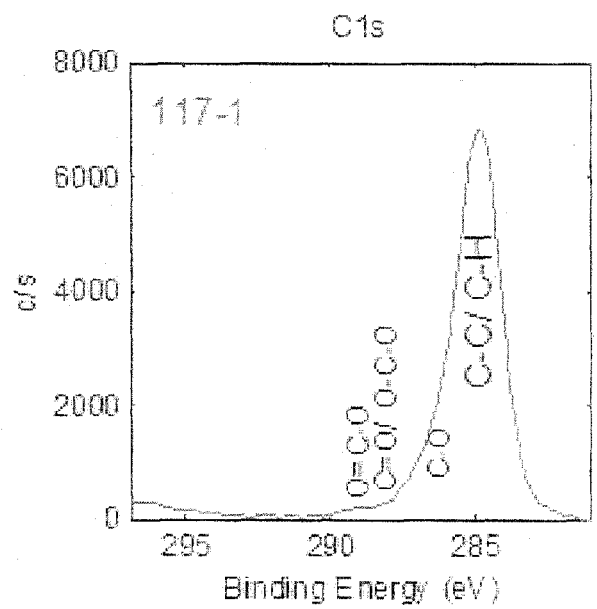
FIG. 13 is an XPS survey spectrum of different carbon compounds in sample 368-180-1.

XPS spectrum measurements of the coated substrates in the present example are presented in FIG. 12. Other than the elements oxygen (O 1s and O 2s) and silicon (Si 2s and Si 2p), carbon (C 1s) is detected, providing a binding energy of about 284.8 eV. A more detailed XPS spectrum shown in FIG. 13 displays the different carbon compounds that are present. In order to compensate for surface charge effects, bonding energies are calibrated using the C 1s hydrocarbon peak at 284.8 eV. The binding energy shown from 286.3 eV to 286.5 eV is from a C—O group, and the range shown from 287.8 eV to 288.0 eV can be attributed to a C=O or O—C—O group. Finally, the binding energy of O=C—O group is in the range between 288.9 eV to 289.1 eV. The binding energy of Si—O in the SiO2 compound, and/or O in an organic group, is located in the range between 532 eV to 533 eV.

Table 6 lists the composition of the different elements analyzed by the XPS. It will be appreciated that apart from oxygen and silicon elements, many carbon species are found on the coated surface. The high-resolution Si 2p spectrum shows that the Si present is from silica ($SiO_2$), as expected. The C1s spectrum shows that there is a main hydrocarbon (C—C/C—H) component, which is a contribution from the oxidized functional groups (C—O, C=O/O—C—O and O=C—O). The contributions of various carbon bonds to C 1s, derived from the C 1s curve-fitting, are summarized in Table 7.

TABLE 6

Atomic concentrations
Atomic. %

| ID | C | O | Si |
|---|---|---|---|
| 386-180-1 | 21.1 | 55.4 | 23.5 |

TABLE 7

Composition of carbon compound

| Chem. species | C—C/C—H | C—O | C=O/O—C—O | O=C—O |
|---|---|---|---|---|
| % | 84 | 14 | 1 | 1 |

V. Thickness and Refractive Index

The thickness and refractive index of the coated substrate surfaces are measured and summarized in Table 8. That is, table 8 lists the thickness and refractive index of the substrate surface coated by sols composed of different alkylsiloxane. The coating layer is a typical thin film with anti-reflection characteristics. In certain example embodiments, the coating will have a thickness of preferably about 60 nm to about 100 nm, more preferably about 70 nm to about 90 nm, and most preferably about 75 nm to about 85 nm. However, in other example embodiments, the thickness may be higher or lower. The coating may have a refractive index preferably of less than 1.5, more preferably below 1.3, and more preferably below or equal to about 1.23. Specifically, the present example involves a coating with a thickness of about 80 nm, and a refractive index in the range between about 1.201 to about 1.238.

TABLE 8

Thickness and refractive index of substrate surface
coated using sols with different alkylsiloxanes

| ID | Siloxane in sol | Thickness (nm) | Refractive index (550 nm) |
|---|---|---|---|
| 368-180-1 | Octyltrimethoxysilane (OTMOS)/TEOS 50:50 wt. ratio | 86.39 | 1.223 |
| 368-180-2 | Pentyltriethoxysilane (PTEOS)/TEOS; 50:50 wt. ratio | 78.618 | 1.201 |
| 368-180-3 | 3,3,3-trifluoropropyl trimethoxysilane (TFTMOS)/TEOS; 50:50 wt. ratio | 80.47 | 1.233 |
| 368-180-4 | Tetraethyl orthosilicate (TEOS) | 87.08 | 1.238 |

Solid wt. % = 2 wt. %
Aged time of sol < 1 month
Spin coating: 3000 rpm; 255 ramp; 30 sec; 0.5 ml of sol
Curing at 200° C. for 5 min Effects of Sol Aging Time and Curing Time Effects of sol aging time is evaluated in the present example through the assessments of the water contact angles of sessile drops of water, and the broadband reflection of the coated substrate surfaces of different sol compositions.

The TEOS-only sol in Table 4 was split into two batches, and separately aged for one month and eight months at room temperature before being coated onto a substrate. Table 9 summarizes the water contact angle measurements of coated substrate surfaces with different sol compositions with the different aging times. The results show that a hydrophobic surface may be achieved with a short aging time because a lower water contact angle of substrate coated by sol aged for eight month is observed. It is believed that a sol with a longer aging time may contain a lower amount of TEOS that is only partially hydrolyzed, which can result in a surface with a lower amount of alkylsiloxane group chains. In that case, a hydrophilic surface may be observed.

TABLE 9

Water contact angle of substrate coated
using sols with different age times

| ID | wt. % of sol | Aged time (Month) | Contact angle | | | Avg. | STD |
|---|---|---|---|---|---|---|---|
| 368-172-1 | 1 | 1 | 117.81 | 112.60 | 134.12 | 121.51 | 11.23 |
| 368-172-2 | 2 | 1 | 113.07 | 108.35 | 112.07 | 111.16 | 2.49 |
| 368-172-3 | 3 | 1 | 119.80 | 107.19 | 99.65 | 108.88 | 10.18 |
| 368-174-1 | 1 | 8 | 10.74 | 9.31 | 10.23 | 10.09 | 0.72 |
| 368-174-2 | 2 | 8 | 16.52 | 20.11 | 24.19 | 20.27 | 3.84 |
| 368-174-3 | 3 | 8 | 12.90 | 6.95 | 10.47 | 10.11 | 2.99 |

Figure 14:
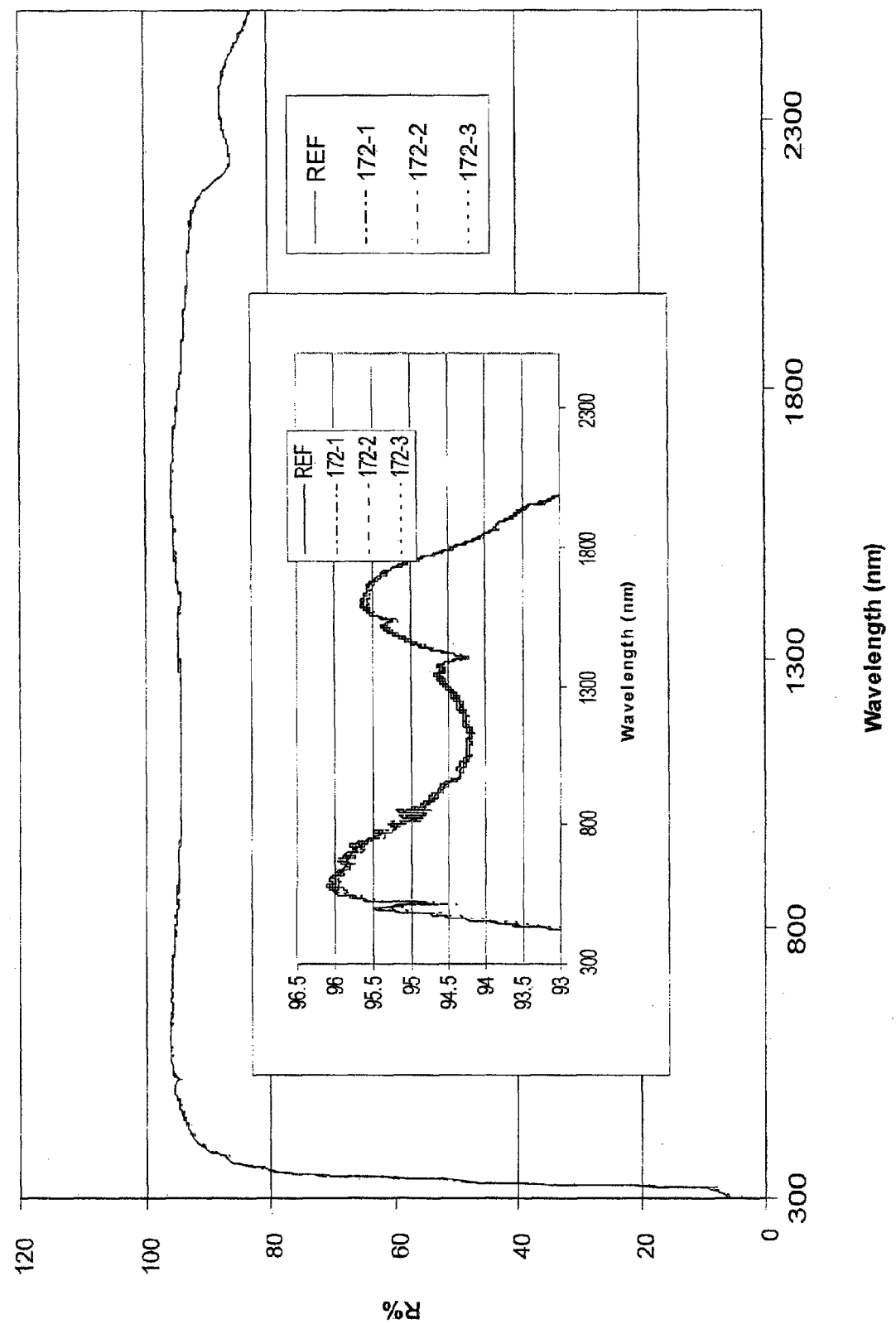
FIG. 14 is a graph of average total reflection of substrates coated by a sol and aged for one month.
Figure 15:
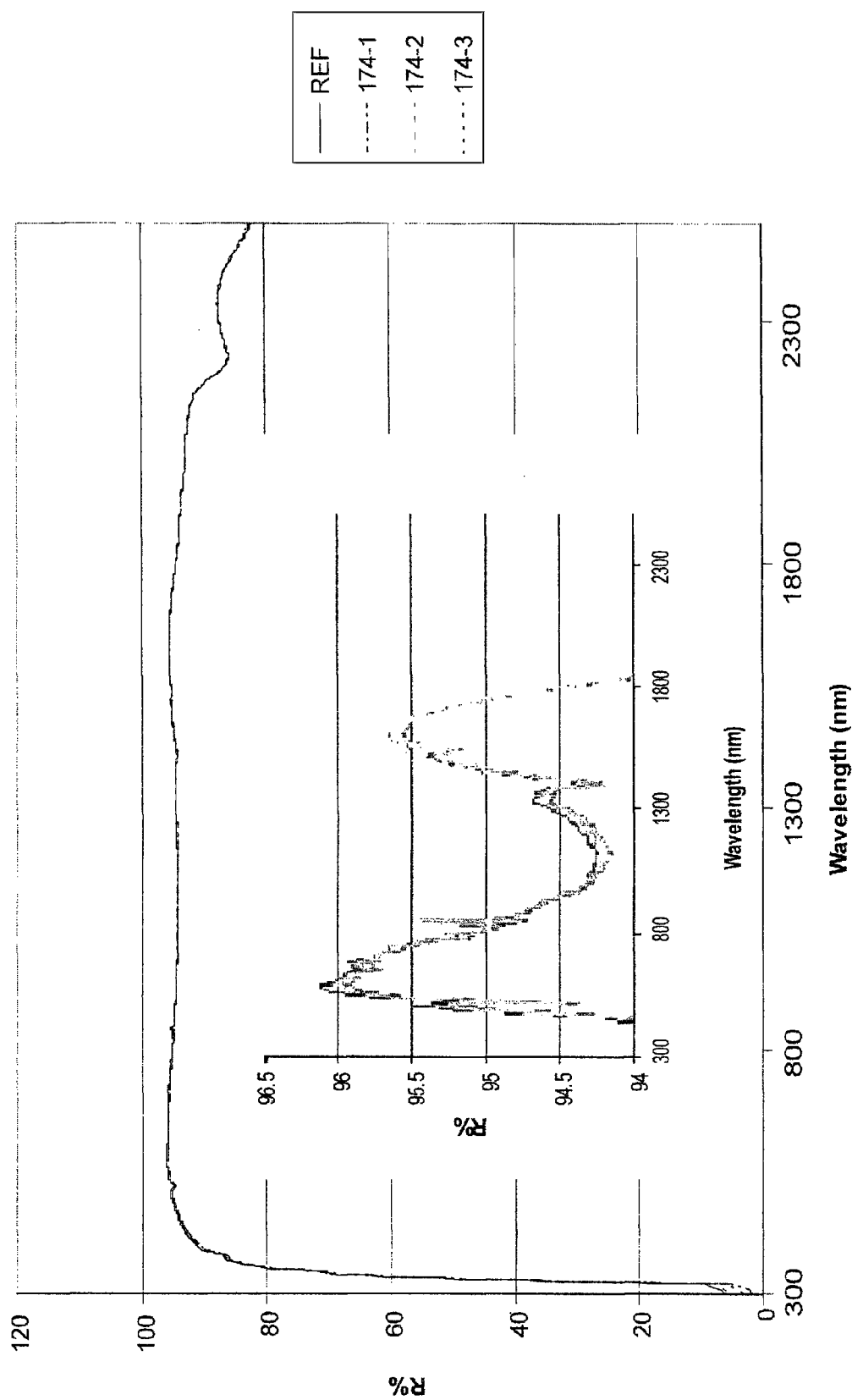
FIG. 15 is a graph of average total reflection of substrates coated by a sol and aged for eight months.
Figure 16:
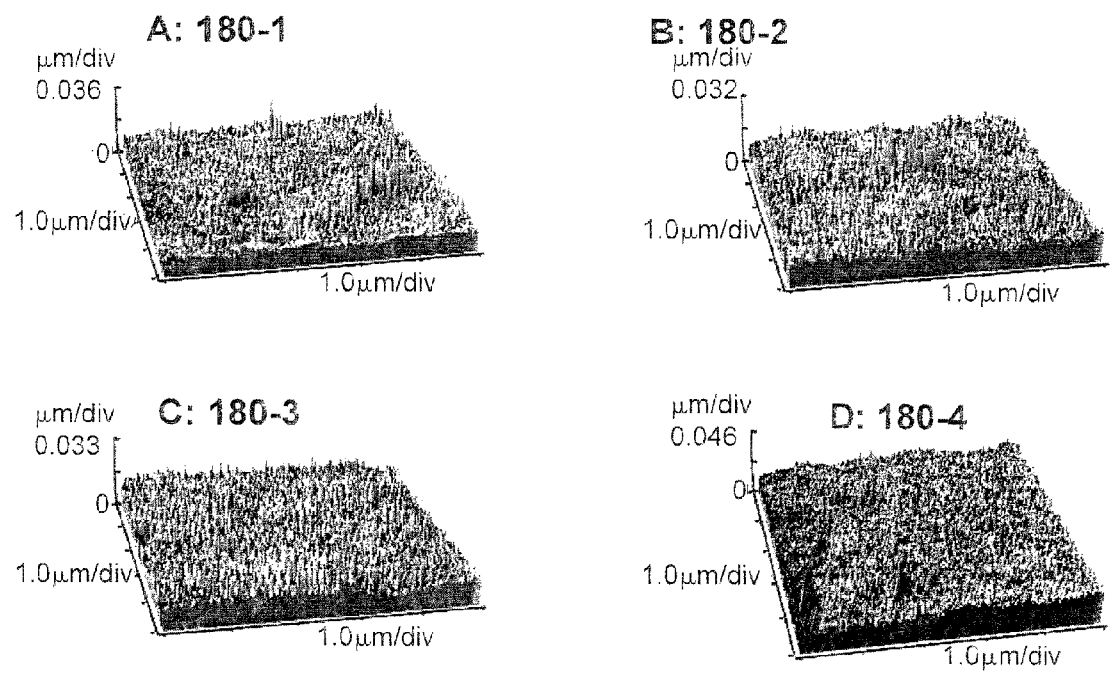
FIG. 16A is an atomic force microscope (AFM) image of a coating formed from an alkylsiloxane-inclusive sol with 50:50 wt. % of OTMOS and TEOS.
FIG. 16B is an AFM image of a coating formed from an alkylsiloxane-inclusive sol with 50:50 wt. % of Pentyltriethoxysiloxane (PTEOS) and TEOS.
FIG. 16C is an AFM image of a coating formed from an alkylsiloxane-inclusive sol with 50:50 wt. % of 3,3,3-Trifluoropropyl trimethoxysiloxane (TFTMOS) and TEOS.
FIG. 16D is an AFM image of a coating formed from an alkylsiloxane-inclusive sol with TEOS only.

Spin coating: 3000 rpm; 255 ramp; 30 sec; 0.5 ml of sol
Curing at 200° C. for 5 min Broadband reflections of coated substrates with the TEOS-only sols of different aging times are summarized in Table 10 as the calculated average total reflections. The calculated values are also presented in FIGS. 14 and 15. The results show that there is no substantial change between reflections of substrate surfaces coated by sols with different aging time. The hydrophobic or hydrophilic properties observed on the surface do not seem to alter the reflection on the substrate. Generally, R % of the uncoated mirror is about 94.24%; coated substrates as also substantially the same as the uncoated mirror. The R % gain preferably is no less than about 0.15% lower than the uncoated mirror for the aging time of eight months, and more preferably no less than 0.11% lower than the uncoated mirror for the aging time of one month.

TABLE 10

Reflection of substrates coated with sols with different age times

| ID | Sol wt. % | Aged time, (Month) | R % | R % gain |
|---|---|---|---|---|
| uncoated mirror | 0 | | 94.24 | — |
| 368-172-1 | 1 | 1 | 94.24 | 0 |
| 368-172-2 | 2 | 1 | 94.25 | 0.01 |
| 368-172-3 | 3 | 1 | 94.13 | −0.11 |
| 368-174-1 | 1 | 8 | 94.1 | −0.14 |
| 368-174-2 | 2 | 8 | 94.18 | −0.06 |
| 368-174-3 | 3 | 8 | 94.19 | −0.05 |

Spin coating: 3000 rpm; 255 ramp; 30 sec; 0.5 ml of sol
Curing at 200° C. for 5 min In addition, the effect of curing time on a substrate surface is measured against the optical performance of the substrate surface. The present example investigates coated substrates made at different curing times at about 200° C. Table 11 summarizes the water contact angle of substrates cured at 200° C. with curing time at about 5 minutes and about 30 minutes. The results show that generally, the water contact angle decreases with an increase in curing time, except for substrates coated by sol with only TEOS. Results show that thermal degradation of alkylsiloxane may occur at a high temperature and a long curing period. It is believed that the decomposition probability of alkylsiloxane groups may depend upon the length of the alkylsiloxane chain, which indicates that longer alkylsiloxane chains may be more likely to decompose. This may explain results in a decrease of water contact angle found on the substrate surfaces coated by sols with longer alkylsiloxane chain groups after a long curing time.

In certain example embodiments, the coated substrates may be cured at a temperature range of about 150° C. to about 250° C., preferably for less than 25 minutes, more preferably less than 15 minutes, still more preferably less than 10 minutes

TABLE 11

Effect of curing time on water contact angle of
substrates coated using sol with alkylsiloxanes

| | | Contact angle, θ | | |
|---|---|---|---|---|
| ID | Siloxane in sol | 200° C., 5 min | 200° C., 30 min | Change |
| 368-180-1/5 | Octyltrimethoxysiloxane (OTMOS)/TEOS 50:50; wt. ratio | 131.13 | 103.68 | −27.45 |
| 368-180-2/6 | Pentyltriethoxysiloxane (PTEOS)/TEOS; 50:50; wt. ratio | 120.68 | 85.08 | −35.60 |
| 368-180-3/7 | 3,3,3-Trifluoropropyl trimethoxysiloxane (TFTMOS)/TEOS; 50:50; wt. ratio | 113.23 | 73.19 | −40.03 |
| 368-180-4/8 | Tetraethyl orthosilicate (TEOS) | 108.91 | 106.75 | −2.15 |

Calculations of the average total reflection of coated substrate surfaces are summarized in Table 12, and are observed to be independent of curing times. Table 12 shows that there are no significant changes between the two sets of samples with different curing times for these samples.

TABLE 12

Effect of curing time on reflection of substrates
coated using sol with different alkylsiloxanes

| | | R % | | |
|---|---|---|---|---|
| ID | Siloxane in sol | 200° C., 5 min | 200° C., 30 min | Change |
| 368-180-1/5 | Octyltrimethoxysiloxane (OTMOS)/TEOS 50:50; wt. ratio | 93.25 | 92.77 | −0.48 |
| 368-180-2/6 | Pentyltriethoxysiloxane (PTEOS)/TEOS; 50:50; wt. ratio | 93.42 | 93.48 | 0.06 |
| 368-180-3/7 | 3,3,3-trifluoropropyl trimethoxysiloxane (TFTMOS)/TEOS; 50:50; wt. ratio | 94.24 | 94.17 | −0.06 |
| 368-180-4/8 | Tetraethyl orthosilicate (TEOS) | 93.36 | 93.27 | −0.09 |

AFM images of the different coated substrates are also compared by assessing the effects of the different alkylsiloxane on the morphology of coated substrates surfaces, and the effects of different aging times of sols on the morphology of substrate surfaces.

Furthermore, the effect of alkylsiloxane on morphology of coated substrates in the present example are presented accordingly in FIGS. 16A, 16B, 16C, and 16D, using AFM images of the coated substrate surfaces. The root mean square (RMS) roughness of certain example embodiments may be about 3 nm to about 6.5 nm, preferably between about 4 nm to about 5 nm, and more preferably between about 4.5 nm to about 4.2 nm. Roughness of the coated surfaces of certain samples were estimated using $R_a$ and $R_m$, and the results are summarized in Table 13, labeled accordingly. The results show that there is no significant difference on surface roughness on coated substrate surfaces by sols with different alkylsiloxane mixtures. However, similar roughness of coated substrate surfaces may be attributed to the fact that the carbon numbers of alkylsiloxane compounds used in this study are similar to each other, which may cause the result of the similar morphology of the surfaces shown in FIGS. 16A, 16B, 16C, and 16D. The morphology of coated substrate surface by the sol is believed to be dominated by the structure and form of the silica nanoparticles coated onto the substrate surfaces. This is believed based on the observation of the measured bond length of C—C of only 0.154 nm, in comparison to the thickness of the silica nanoparticle of about 80 nm shown in Table 6 above.

TABLE 13

Ra and Rm roughness of anti-soiling substrates made using different alkylsiloxanes

| ID | Siloxane in sol | wt. % | Ra (nm) | Rm (nm) |
|---|---|---|---|---|
| 368-180-1 | Octyltrimethoxysiloxane (OTMOS)/TEOS; 50:50; wt. ratio | 2 | 3.251 | 4.231 |
| 368-180-2 | Pentyltriethoxysiloxane (PTEOS)/TEOS; 50:50; wt. ratio | 2 | 3.270 | 4.169 |
| 368-180-3 | 3,3,3-trifluoropropyl trimethoxysiloxane (TFTMOS)/TEOS; 50:50; wt. ratio | 2 | 3.272 | 4.121 |
| 368-180-4 | Tetraethyl orthosilicate (TEOS) | 2 | 4.448 | 5.894 |

Figure 17:
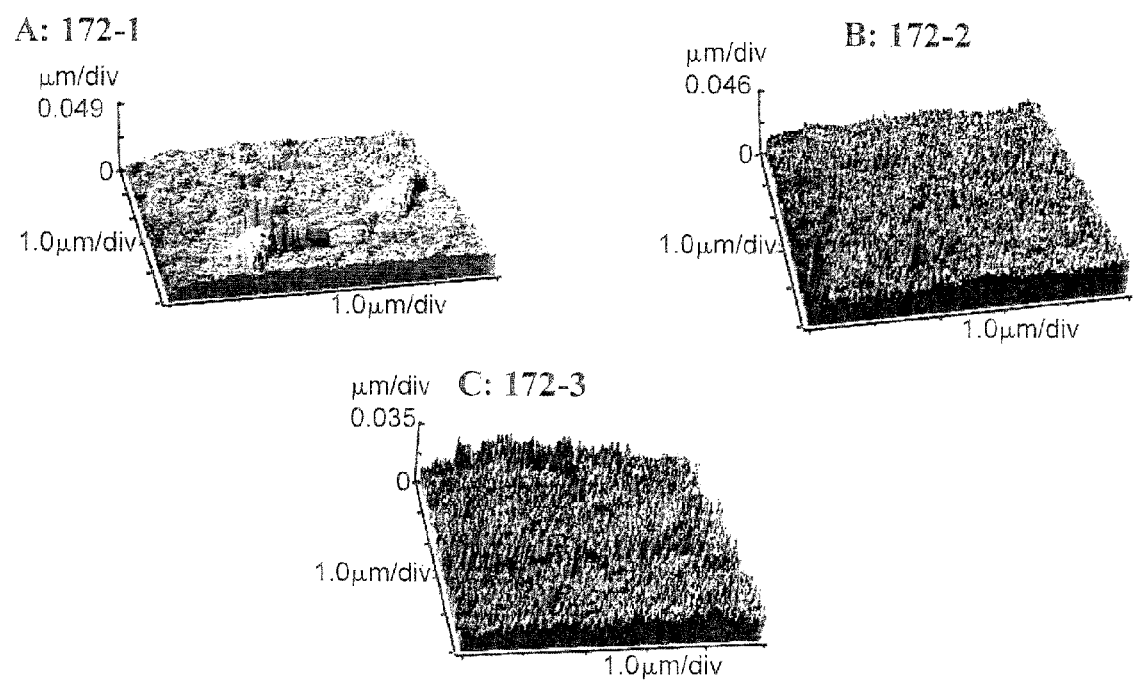
FIGS. 17A, 17B, and 17C are AFM images of anti-soiling substrate coated with sol and aged for one month.
Figure 18:
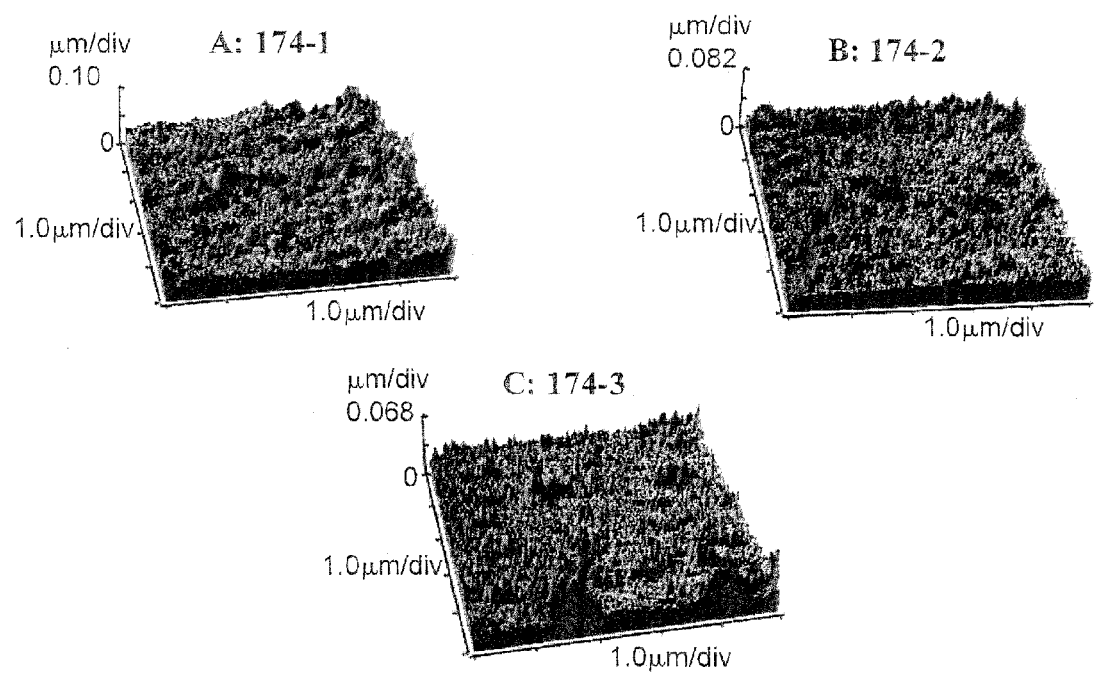
FIGS. 18A, 18B, and 18C are AFM images of anti soiling substrates coated with sol aged and for eight months.

Spin coating: 3000 rpm; 255 ramp; 30 sec; 0.5 ml of sol
Curing at 200° C. for 5 min An assessment of the effect of aging time of sols in the present example, one month and eight months, is performed through a measurement of the AFM morphology of the substrate surfaces, and the results are summarized in Table 14. FIGS. 17A, 17B, and 17C are AFM images of anti-soiling substrate coated with sol and aged for one month, and FIGS. 18A, 18B, and 18C are AFM images of anti soiling substrates coated with sol aged and for eight months. The increase of roughness is observed with the surface of substrates coated by sol with longer aged time. The value of $R_m$ for substrates coated by sol aged for eight month is almost twice the value than that of the sol aged for one month. The increase of surface roughness is believed to be attributable to the fact that the particle size increases with an increase in aging time of sol. This belief is confirmed by the SEM measurement, in which an increase of particle size is seen for the sol with TEOS as the siloxane and acid as the catalyst.

TABLE 14

Ra and Rm roughness of anti soiling substrates made by sols with different aged times

| ID | Aged time, (M) | wt. % of sol | Ra (nm) | Rm (nm) |
|---|---|---|---|---|
| 368-172-1 | 1 | 1 | 4.692 | 6.414 |
| 368-172-2 | 1 | 2 | 4.448 | 5.894 |
| 368-172-3 | 1 | 3 | 4.926 | 6.225 |
| 368-174-1 | 8 | 1 | 10.332 | 13.436 |
| 368-174-2 | 8 | 2 | 8.938 | 11.654 |
| 368-174-3 | 8 | 3 | 6.788 | 9.155 |

Sol: Gen 1.5
Spin coating: 3000 rpm; 255 ramp; 30 sec; 0.5 ml of sol
Curing at 200° C. for 5 min The durability of the coated substrates in the present example was evaluated using a Thermal Cycle Test and a Condensing Humidity Chamber Test. Two coated substrates were evaluated in this present example. The first substrate supported a coating made from a sol with TEOS, and the second substrate supported a coating made from a sol with a mixed siloxane of TEOS and OTMOS.

Tables 15 and 16 summarize the calculated average total reflections based on measured broadband reflections, and measured water contact angles before and after the two durability tests. Table 15 shows no significant change in the average total reflection on the substrate surface. Table 16 also shows no significant change in the water contact angle of the substrate surface coated by the sol with mixed TEOS and OTMOS. However, a large decrease of water contact angle was observed for substrates coated using the sol with only TEOS. The decrease on water contact angle may be attributed to a damaged surface during the chamber test. The coating layer may have been hydrolyzed while exposed to the environment of high temperature and humidity. A more hydrophobic surface may have an added benefit of being resistant to silica hydrolysis. It is believed that this is the reason why a surface of substrate coated by a mixed alkylsiloxane sol comprising TEOS and OTMOS may be more stable than other alkylsiloxane coated substrates.

TABLE 15

Reflection of substrates coated by sol with different alkylsiloxanes

| | Chamber | | R % | | |
|---|---|---|---|---|---|
| ID | test | Siloxane in sol | pre | post | Change |
| 368-180-1 | Thermal cycle | Octyltrimethoxy-siloxane (OTMOS)/TEOS 50:50 wt. ratio | 93.32 | 93.29 | −0.03 |
| 368-180-4 | Thermal cycle | Tetraethyl orthosilicate (TEOS) | 94.22 | 93.28 | −0.94 |
| 368-180-5 | 85%/ 85° C. | Octyltrimethoxy-siloxane (OTMOS)/TEOS 50:50 wt. ratio | 93.38 | 92.95 | −0.43 |
| 368-180-8 | 85%/ 85° C. | Tetraethyl orthosilicate (TEOS) | 93.33 | 92.83 | −0.49 |

Spin coating: 3000 rpm; 255 ramp; 30 sec; 0.5 ml of sol
Test time: 5 day

TABLE 16

Water contact angle of substrates coated by sol with different alkylsiloxanes

| | Chamber | | Water contact angle | | |
|---|---|---|---|---|---|
| ID | test | Siloxane in sol | pre | post | change |
| 368-180-1 | Thermal cycle | Octyltrimethoxy-siloxane (OTMOS)/TEOS 50:50 wt. ratio | 96.40 | 43.24 | −53.16 |
| 368-180-4 | Thermal cycle | Tetraethyl orthosilicate (TEOS) | 111.94 | 115.64 | 3.70 |
| 368-180-5 | 85% humidity/ 85° C. | Octyltrimethoxy-siloxane (OTMOS)/TEOS 50:50 wt. ratio | 111.82 | 126.30 | |
| 368-180-8 | 85% humidity/ 85° C. | Tetraethyl orthosilicate (TEOS) | 96.88 | 33.48 | −63.40 |

Spin coating: 3000 rpm; 255 ramp; 30 sec; 0.5 ml of sol
Test time: 5 day

Figure 19:
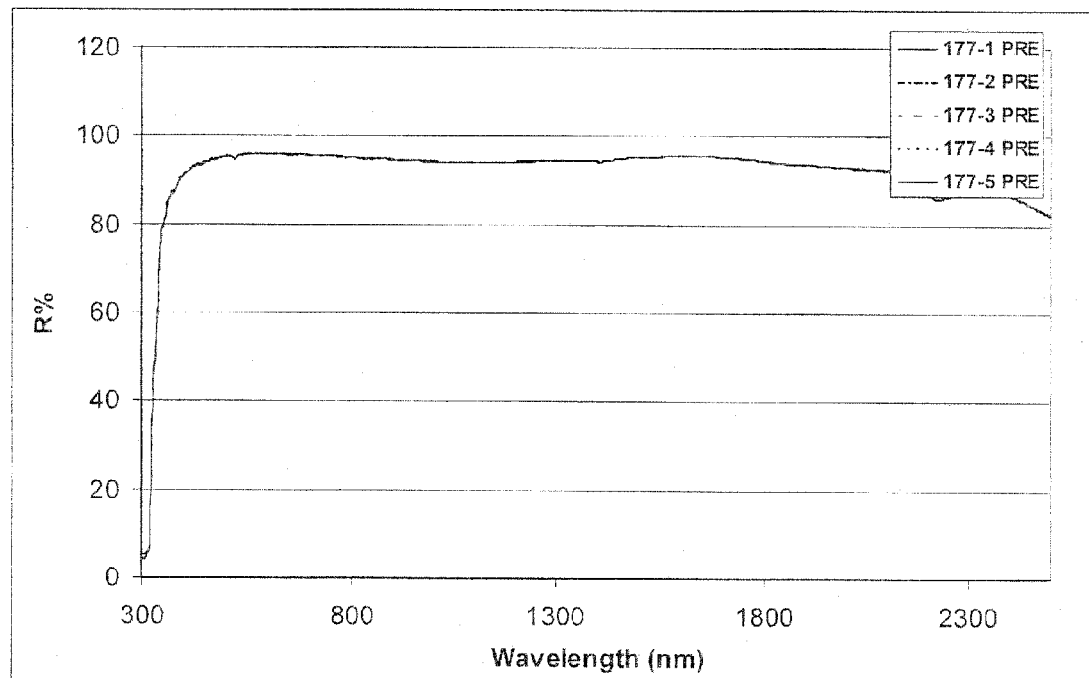
FIG. 19 is a graph of average total reflection of the coated substrates in a repeatability test.

In order to appraise the process developed in the present example, a repeatability test was carried out using five pieces of anti-soiling substrates prepared using a sol with only TEOS. The average total reflection calculated and water contact angles measured during the repeatability test are summarized in Table 17. FIG. 19 further clarifies the reflective properties of the coated substrates. The results show that the average total reflection of the substrates may be as high as 94.21%, and a water contact angle as high as about 100° may be achieved, in certain cases. The error range of the average total reflection is about 0.06%, and the error range of the water contact angle is about 7°.

TABLE 17

Reflection and water contact angle of coated substrates from repeatability test

| ID | R % coated substrate | R % gain | Water contact angle | | |
|---|---|---|---|---|---|
| 368-177-1 | 94.18 | −0.06 | 112.58 | 106.61 | 115.43 |
| 368-177-2 | 94.17 | −0.07 | 100.42 | 111.92 | 99.91 |
| 368-177-3 | 94.25 | 0.01 | 105.05 | 107.98 | 109.07 |
| 368-177-4 | 94.29 | 0.05 | 112.56 | 120.56 | 109.76 |
| 368-177-5 | 94.16 | −0.08 | 96.56 | 103.3 | 102.48 |
| Avg. R % | 94.21 | −0.03 | 105.43 | 110.07 | 107.33 |
| STD | 0.06 | 0.06 | 7.17 | 6.63 | 6.19 |

TEOS-only sol aged for one month
R % of uncoated mirror: 94.24%

Observations from the presently disclosed example suggest that a substrate surface coated with a sol composed of TEOS and OTMOS, cured at a shorter time, and aged at a shorter time, exhibit hydrophobicity. The water contact angle and durability measurements show that such a composition and procedure may allow the water droplets to perform the desired rolling action, thus making it possible to achieve anti-soiling properties in some instances. The present example also shows a high $R_m$ value on the surface after a long aging time may not achieve a hydrophobic property as suggested.

Certain example embodiments also may be conducted on other substrates, i.e. a soda lime silicate glass, and/or so-called low-iron glass. Low-iron glass is described in, for example, U.S. Pat. Nos. 7,893,350; 7,700,870; 7,557,053; 6,299,703; and 5,030,594, and U.S. Publication Nos. 2006/0169316; 2006/0249199; 2007/0215205; 2009/0223252; 2010/0122728; 2010/0255980; and 2011/0275506. The entire contents of each of these documents is hereby incorporated herein by reference.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

In certain example embodiments, a method of making a coated article comprising a glass substrate supporting a coating is provided. A sol is wet-applied, directly or indirectly, on a major surface of the substrate. The sol comprises at least first and second alkylsiloxane chemicals, with the first and second alkylsiloxane chemicals having tetra-alkoxysiloxane and tri-alkoxysiloxane structures, respectively. The sol is dried and/or cured to form the coating. The sol is aged for no more than five months prior to the wet-applying.

In addition to the features of the previous paragraph, in certain example embodiments, the alkylsiloxane chemicals may be provided at substantially equal weight percentages.

In addition to the features of either of the two previous paragraphs, in certain example embodiments, the alkylsiloxane chemicals may be selected from the group consisting of octyltrimethoxysiloxane (OTMOS), pentyltriethoxysiloxane (PTEOS), 3,3,3-trifluoropropyl trimethoxysiloxane (TFT-MOS), tetraethyl orthosilicate (TEOS), and combinations thereof.

In addition to the features of any of the three previous paragraphs, in certain example embodiments, the sol may be aged for less than or equal to 1 month prior to the wet-applying.

In addition to the features of any of the four previous paragraphs, in certain example embodiments, the coating may have a root mean square roughness of 3-6.5 nm.

In addition to the features of any of the five previous paragraphs, in certain example embodiments, alkylsiloxane chains may protrude outwardly from a surface of the coating.

In addition to the features of any of the six previous paragraphs, in certain example embodiments, alkylsiloxane groups may be hydrolyzed using an acid catalysis process.

In addition to the features of the previous paragraph, in certain example embodiments, the hydrolyzed alkylsiloxane groups may be partially condensed to form a tetra-cyclic siloxane, e.g., providing nucleation sites for further growths to become three-dimensional particles on the coating.

In addition to the features of the previous paragraph, in certain example embodiments, the three-dimensional particles may grow to 1-5 nm in major distance, with a precursor solution pH of 1-8.

In addition to the features of any of the nine previous paragraphs, in certain example embodiments, the coating may be a refractive index below 1.3 and/or a thickness of 60-100 nm.

In addition to the features of any of the ten previous paragraphs, in certain example embodiments, the coating may be cured for less than 25 minutes.

In addition to the features of any of the 11 previous paragraphs, in certain example embodiments, a water contact angle theta of the coating may be greater than about 100 degrees.

In certain example embodiments, a method of making a coated article comprising a glass substrate supporting a coating is provided. A sol is wet-applied, directly or indirectly, on a major surface of the substrate, with the sol comprising tetraethyl orthosilicate (TEOS) and octyltrimethoxysiloxane (OTMOS). The sol is dried and/or cured to form the coating. The coating has an initial contact angle of 100-131 degrees.

In addition to the features of the previous paragraph, in certain example embodiments, the coating may have a root mean square roughness of 4-5 nm.

In addition to the features of either of the two previous paragraphs, in certain example embodiments, TEOS and OTMOS may be provided in weight percentages in the sol that differ from one another by no more than 5%.

In addition to the features of any of the three previous paragraphs, in certain example embodiments, the sol may be aged for no more than about five months prior to the wet-applying.

In addition to the features of any of the four previous paragraphs, in certain example embodiments, the coating may have a refractive index of less than 1.3.

In addition to the features of any of the five previous paragraphs, in certain example embodiments, the coating may be provided at a thickness of 70-90 nm.

In addition to the features of any of the six previous paragraphs, in certain example embodiments, the coating may be cured for less than 15 minutes.

In certain example embodiments, a method of making a mirror is provided. A thin film coating is disposed on a first major surface of the substrate, with the thin film coating having a reflectivity of at least about 85%. A sol is wet-applied, directly or indirectly, onto the thin film coating. The sol comprises at least first and second alkylsiloxane chemicals, with the first and second alkylsiloxane chemicals having tetra-alkoxysiloxane and tri-alkoxysiloxane structures, respectively, and with the sol having been aged for no more than three months prior to the wet-applying. The sol is dried and/or cured to form an anti-soiling coating that at least initially has a contact angle of greater than 100 degrees.

In addition to the features of the previous paragraph, in certain example embodiments, reflection from the mirror may be no more than 0.15% lower than the reflection would be if no anti-soiling coating were present.

In addition to the features of either of the two previous paragraphs, in certain example embodiments, the alkylsiloxane chemicals may be selected from the group consisting of octyltrimethoxysiloxane (OTMOS), pentyltriethoxysiloxane (PTEOS), 3,3,3-trifluoropropyl trimethoxysiloxane (TFT-MOS), tetraethyl orthosilicate (TEOS), and combinations thereof.

In addition to the features of any of the three previous paragraphs, in certain example embodiments, the anti-soiling coating may have a refractive index of less than 1.3.

In addition to the features of any of the four previous paragraphs, in certain example embodiments, the anti-soiling coating may have a thickness of 60-100 nm.

In addition to the features of any of the five previous paragraphs, in certain example embodiments, the anti-soiling coating may have a curing time of less than 25 minutes.

In certain example embodiments, a sol composition is provided. At least two alkylsiloxane chemicals are provided at substantially the same weight percents. A first alkylsiloxane chemical has a tetra-alkoxysiloxane structure, and a second alkylsiloxane chemical has a tri-alkoxysiloxane structure. The sol composition is aged less than 3 months and has a cure time less than 10 minutes.

In addition to the features of the previous paragraph, in certain example embodiments, the alkylsiloxane chemicals may be selected from the group consisting of octyltrimethoxysiloxane (OTMOS), pentyltriethoxysiloxane (PTEOS), 3,3, 3-trifluoropropyl trimethoxysiloxane (TFTMOS), tetraethyl orthosilicate (TEOS, Aldrich), and combinations thereof.

In certain example embodiments, a coated article is provided. A multi-layer thin film coating is disposed, directly or indirectly, on a first major surface of a substrate, with the thin film coating having a reflectivity of at least about 85%. A wet-applied anti-soiling coating is formed from a sol aged for no more than about three months prior to the wet application and comprising tetra-alkoxysiloxane and tri-alkoxysiloxane components at least initially provided in substantially equal weight percents. The anti-soiling coating has an initial contact angle theta greater than 100 degrees, a refractive index less than 1.3, a thickness of 60-100 nm, and a root mean square roughness of 3-6.5 nm.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. In certain embodiments, other experimental procedures, alkylsiloxane mixtures, and curing times may be used in connection to one or a combination of the limitations described above.

What is claimed is:

1. A method of making a coated article comprising a glass substrate supporting a coating, the method comprising:
    wet-applying a sol, directly or indirectly, on a major surface of the substrate, the sol comprising at least first and second alkylsiloxane chemicals, the first and second alkylsiloxane chemicals comprising tetraethyl orthosilicate (TEOS) and octyltrimethoxysiloxane (OTMOS), respectively, wherein TEOS and OTMOS are provided in weight percentages in the sol that differ from one another by no more than 5%; and
    drying and/or curing the sol to form the coating, the coating having a root mean square roughness of 3-6.5 nm,
    wherein the sol is aged for no more than five months prior to the wet-applying.

2. The method of claim 1, wherein the alkylsiloxane chemicals are provided at substantially equal weight percentages.

3. The method of claim 1, wherein the sol is aged for less than or equal to 1 month prior to the wet-applying.

4. The method of claim 1, wherein alkylsiloxane chains protrude outwardly from a surface of the coating.

5. The method of claim 1, wherein alkylsiloxane groups are hydrolyzed using an acid catalysis process.

6. The method of claim 5, wherein the hydrolyzed alkylsiloxane groups are partially condensed to form a tetra-cyclic siloxane, providing nucleation sites for further growths to become three-dimensional particles on the coating.

7. The method of claim 6, wherein the three-dimensional particles grow to 1-5 nm in major distance, with a precursor solution pH of 1-8.

8. The method of claim 1, wherein the coating has a refractive index below 1.3 and a thickness of 60-100 nm.

9. The method of claim 1, wherein the coating is cured for less than 25 minutes.

10. The method of claim 1, wherein a water contact angle theta of the coating is greater than about 100 degrees.

11. A method of making a coated article comprising a glass substrate supporting a coating, the method comprising:
    wet-applying a sol, directly or indirectly, on a major surface of the substrate, the sol comprising tetraethyl orthosilicate (TEOS) and octyltrimethoxysiloxane (OTMOS), wherein TEOS and OTMOS are provided in weight percentages in the sol that differ from one another by no more than 5%; and
    drying and/or curing the sol to form the coating;
    the coating having a root mean square roughness of 3-6.5 nm;
    wherein the coating has an initial contact angle of 100-131 degrees.

12. A method of claim 11, wherein the coating has a root mean square roughness of 4-5 nm.

13. The method of claim 11, wherein the sol is aged for no more than about five months prior to the wet-applying.

14. The method of claim 11, wherein the coating has a refractive index of less than 1.3.

15. The method of claim 14, wherein the coating is provided at a thickness of 70-90 nm.

16. The method of claim 11, wherein the coating is cured for less than 15 minutes.

17. A method of making a mirror, the method comprising:
    disposing a thin film coating on a first major surface of the substrate, the thin film coating having a reflectivity of at least 85%;
    wet-applying a sol, directly or indirectly, onto the thin film coating, the sol comprising at least first and second alkylsiloxane chemicals, the first and second alkylsiloxane chemicals comprising tetraethyl orthosilicate (TEOS) and octyltrimethoxysiloxane (OTMOS), respectively, wherein TEOS and OTMOS are provided in weight percentages in the sol that differ from one another by no more than 5%, the sol having been aged for no more than three months prior to the wet-applying, and alkylsiloxane groups are hydrolyzed and partially condensed to form a tetra-cyclic siloxane, providing nucleation sites for further growths to become three-dimensional particles on the coating; and drying and/or curing the sol to form an anti-soiling coating that at least initially has a contact angle of greater than 100 degrees, the coating having a root mean square roughness of 3-6.5 nm.

18. The method of claim 17, wherein reflection from the mirror is no more than 0.15% lower than the reflection would be if no anti-soiling coating were present.

19. The method of claim 17, wherein the anti-soiling coating has a refractive index of less than 1.3.

20. The method of claim 19, wherein the anti-soiling coating has a thickness of 60-100 nm.

21. The method of claim 17, wherein the anti-soiling coating has a curing time of less than 25 minutes.

* * * * *